United States Patent
Shahgoshtasbi et al.

(10) Patent No.: US 12,271,699 B2
(45) Date of Patent: Apr. 8, 2025

(54) MULTI-DIMENSIONAL N-GRAM PREPROCESSING FOR NATURAL LANGUAGE PROCESSING

(71) Applicant: ServiceNow, Inc., Santa Clara, CA (US)

(72) Inventors: Dariush Shahgoshtasbi, Bellevue, WA (US); Brian Robert Silverstein, Seattle, WA (US); James Allen Crotinger, Kirkland, WA (US)

(73) Assignee: ServiceNow, Inc., Santa Clara, CA (US)

( * ) Notice: Subject to any disclaimer, the term of this patent is extended or adjusted under 35 U.S.C. 154(b) by 413 days.

(21) Appl. No.: 17/720,142

(22) Filed: Apr. 13, 2022

(65) Prior Publication Data

US 2023/0334248 A1 Oct. 19, 2023

(51) Int. Cl.
 *G06F 40/295* (2020.01)
 *G06F 40/30* (2020.01)
 *G06F 40/58* (2020.01)

(52) U.S. Cl.
 CPC .......... *G06F 40/295* (2020.01); *G06F 40/30* (2020.01); *G06F 40/58* (2020.01)

(58) Field of Classification Search
 CPC .. G06Q 30/0201; G06N 20/00; G06F 40/253; G06F 40/295; G06F 40/30
 See application file for complete search history.

(56) References Cited

U.S. PATENT DOCUMENTS

| | | | |
|---|---|---|---|
| 10,977,424 B2 * | 4/2021 | Panguluri | G06F 40/253 |
| 11,017,321 B1 | 5/2021 | Mishra | |
| 11,222,165 B1 | 1/2022 | Ramos | |
| 11,822,875 B2 * | 11/2023 | Mukherjee | G06F 40/166 |
| 2004/0133560 A1 * | 7/2004 | Simske | G06F 16/355 |
| | | | 707/E17.084 |
| 2015/0220539 A1 | 8/2015 | Lambert | |
| 2015/0356401 A1 * | 12/2015 | Vinyals | G06N 3/045 |
| | | | 706/15 |
| 2017/0161259 A1 * | 6/2017 | Zhao | G06F 40/166 |
| 2017/0186102 A1 * | 6/2017 | Di | G06Q 50/01 |
| 2018/0089156 A1 * | 3/2018 | Kapoor | G06F 16/90335 |

(Continued)

FOREIGN PATENT DOCUMENTS

CN 108628833 A * 10/2018 ............ G06F 40/211

OTHER PUBLICATIONS

Summarizer: Fuzzy Rule-Based Classification Systems for Vertical and Horizontal Big Data, Date of Conference: Jul. 19-24, 2020, Date Added to IEEE Xplore: Aug. 26, 2020 (Year: 2020).*

*Primary Examiner* — Mohammad K Islam
(74) *Attorney, Agent, or Firm* — MCDONNELL BOEHNEN HULBERT & BERGHOFF LLP

(57) ABSTRACT

Origin text content to be analyzed using natural language processing is received. A two-dimensional item sequence representation for at least a portion of the received origin text content is generated. Using one or more processors, one or more evaluation metrics are determined based on an analysis of the two-dimensional item sequence representation. A reduced version of the origin text content is automatically generated based on the one or more evaluation metrics to assist in satisfying a constraint of a natural language processing model. The reduced version of the origin text content is used as an input to the natural language processing model.

20 Claims, 13 Drawing Sheets

(56) References Cited

U.S. PATENT DOCUMENTS

| | | |
|---|---|---|
| 2019/0286753 A1 | 9/2019 | Feng |
| 2020/0081909 A1* | 3/2020 | Li .................. G06F 40/258 |
| 2020/0104367 A1 | 4/2020 | Tagra |
| 2021/0286105 A1 | 9/2021 | Gaitan Ospina |
| 2021/0319457 A1 | 10/2021 | Currier |
| 2021/0326362 A1 | 10/2021 | Mondal |
| 2022/0222441 A1* | 7/2022 | Liu .................... G06F 40/35 |
| 2022/0310075 A1 | 9/2022 | Lee |
| 2022/0358005 A1 | 11/2022 | Saha |
| 2023/0161778 A1 | 5/2023 | Qiao |
| 2023/0244855 A1 | 8/2023 | Attwater |
| 2023/0317215 A1 | 10/2023 | Ghosh |

\* cited by examiner

# MULTI-DIMENSIONAL N-GRAM PREPROCESSING FOR NATURAL LANGUAGE PROCESSING

BACKGROUND OF THE INVENTION

Text summarization condenses a longer document down to the document's key points. By highlighting the most critical points of the original document, a user can be presented with the generated summary as an alternative or in addition to the original document. Text summarization techniques can be applied to a variety of document types such as knowledge-based articles, news articles, research papers, marketing material, financial documents, and email. Summarization results can also be used as input to applications that use Natural Language Processing.

BRIEF DESCRIPTION OF THE DRAWINGS

Various embodiments of the invention are disclosed in the following detailed description and the accompanying drawings.

DETAILED DESCRIPTION

Figure 1:
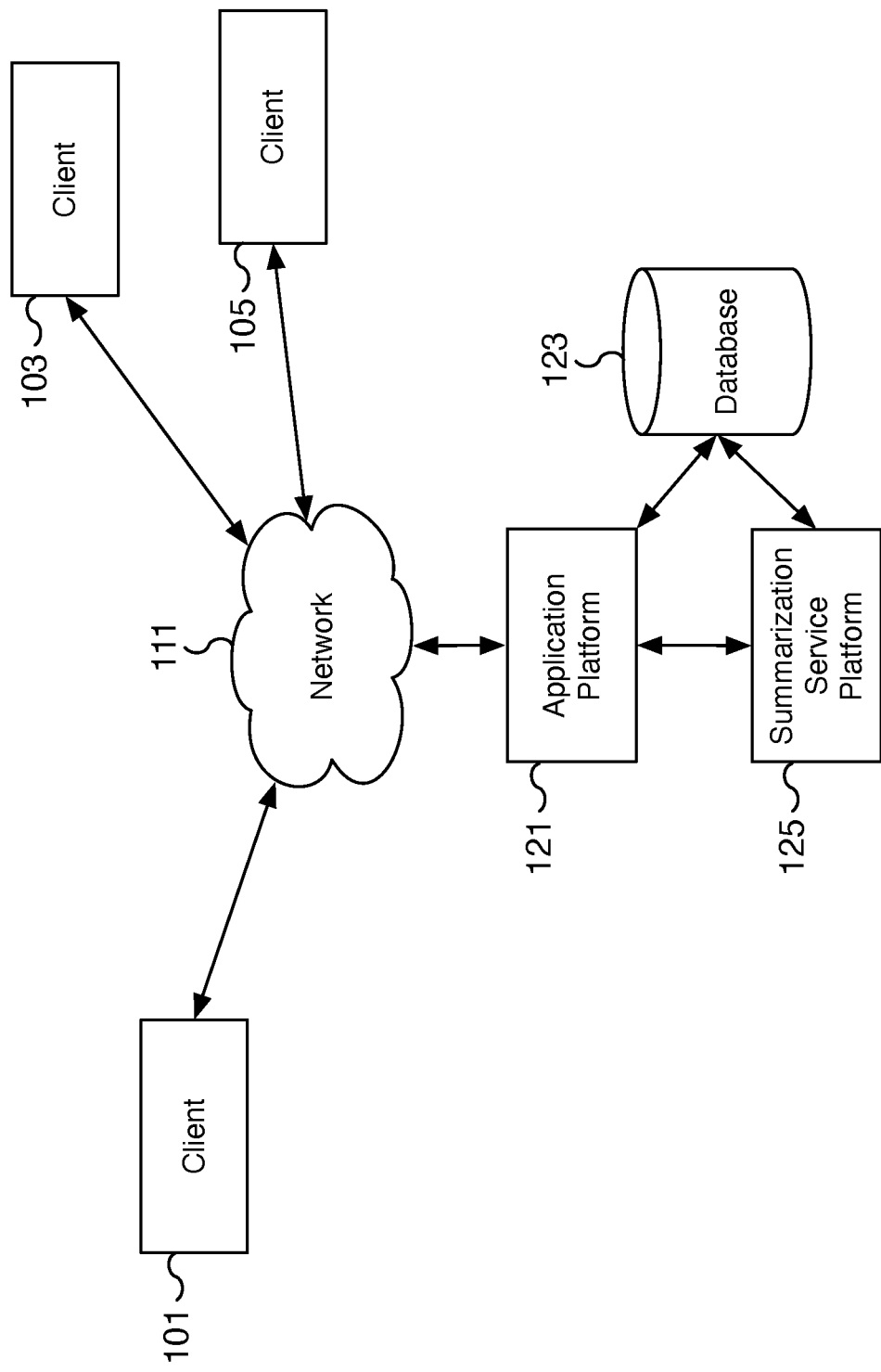
FIG. 1 is a block diagram illustrating an example of a network environment for text summarization.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Text summarization techniques using a preprocessing pipeline for natural language processing are disclosed. Using the disclosed techniques, a body of text can be summarized into a shortened text result. The shortened text result can highlight the most critical points of the original document, maintaining the meaning of the original text but in a reduced number of words. Since the summarization result is shorter than the original document, the summarization results can be used as input for additional natural language processing, particularly natural language processing applications that have limitations on the text input size. For example, the disclosed techniques can summarize a multi-page document down to a reduced size, such as 500 to 1000 words, matching the input limit for natural language processing models. In various embodiments, the text summarization techniques can employ one or more stages of preprocessing to reduce and summarize the original document.

In some embodiments, one preprocessing step applied to reduce the original text involves labeled clustering. The disclosed labeled clustering preprocessing technique allows sentences to be classified into relevant and non-relevant (or junk) sentences. The non-relevant sentences may (or may not) be meaningful but are not relevant to the summarization and can be removed. For example, conversations between customers and operators can include certain conversational topics that are meaningful but not relevant to text summarization, such as "Thank you for your time on during the video conference meeting." and "I am working in the U.S. Eastern time zone." These sentences from the original document are identified as non-relevant (or junk) sentences and are removed during preprocessing. In various embodiments, the sentences of the original document are vectorized and then included or excluded by matching the vectorized sentence to labeled training data. Example sentence vectorization techniques include sentence embedding techniques such as universal sentence encoders. In various embodiments, the labeled training data is generated by vectorizing the sentences of a training set of documents and assigning the vectorized sentences into clusters. Each cluster is then labeled, for example, manually, as relevant or non-relevant (or similarly as junk or non-junk). The centroid sentence of each cluster is identified and stored along with the cluster's label. When a new document is processed, each sentence is vectorized and the closest centroid is identified. The new sentence is labeled using the label of the matching centroid. Sentences labeled as non-relevant (or junk) are removed during this preprocessing step.

In some embodiments, origin text content is received to be analyzed using natural language processing. For example, an input source document is received for summarization using natural language processing. Using one or more processors, the received origin text content is preprocessed including by vectorizing at least a portion of the received origin text content. For example, a labeled clustering preprocessing step is performed by first vectorizing one or more portions of the source document. In various embodiments, the vectorized portions can be based on sentence boundaries. The preprocessing further identifies a closest matching centroid to automatically generate a reduced version of the origin text content. For example, for each vectorized portion of the source document, a closest matching centroid is identified. In the event the closest matching centroid is determined to be relevant, the corresponding matching portion of the source document that was vectorized is included in the reduced version of the original document. Similarly, in the event the closest matching centroid is determined to be non-relevant, the corresponding matching portion of the source document that was vectorized is excluded in the reduced version of the original document. In some embodiments, the preprocessing is performed to assist in satisfying a constraint of a natural language processing model. For example, the natural language processing model can have a size input constraint, such as a word (or token) count constraint on the input to the natural language processing model. In various embodiments, the tokens used by the natural language processing model can be word-based tokens. In some embodiments, the reduced version of the origin text content is used as an input to the natural language processing model. For example, a natural language processing (NLP) model can be applied to the reduced version of the origin text to generate a summary or abstract of the origin text content. In various embodiments, the generated output can be an extractive or abstractive summary. The result of the natural language processing model is provided for use in managing a computerized workflow. For example, the output from natural language processing can be used to support various services including cloud-based application services such as search engines, providing abstracts of knowledge-based articles, and providing summaries in incident cases, among others.

In some embodiments, an N-gram preprocessing step is applied to remove non-relevant sentences from the original text. The disclosed N-gram preprocessing technique allows arbitrarily long sentences to be analyzed for relevance by analyzing the sentence as a two-dimensional N-gram item sequence representation of the sentence. Meaningful sentences are identified from input sentences. For example, each item of a row can be evaluated by using an evaluation dictionary followed by evaluating each sentence's two-dimensional N-gram using a horizontal metric and a vertical metric. Sentences that meet the required thresholds are labeled as meaningful and those that do not are labeled as non-meaningful and excluded from further summarization processing. In various embodiments, the size of the N-gram is configurable. For example, using five words as the size of the N-gram, each N-gram contains five words from the sentence. For a sentence with eight words, the first N-gram includes the first five words (words 1 through 5), the second N-gram includes words 2 through 6, the third N-gram includes words 3 through 7, and the fourth and last N-gram includes the last five words (words 4 through 8). The N-grams are arranged as rows to create a two-dimensional N-gram with four rows of N-grams. For each N-gram, each word of the N-gram is evaluated as meaningful or not meaningful and the total number of meaningful words for the N-gram is used to determine a horizontal metric. Each N-gram can then be labeled as meaningful or non-meaningful based on whether the N-gram meets a configured horizontal threshold. Using the labeled N-grams, a vertical metric is then determined based on the number of N-gram rows that were identified as meaningful. In the event the vertical metric meets the vertical threshold, the sentence is identified as meaningful. In the event the vertical metric does not meet the vertical threshold, the sentence is identified as non-meaningful and is removed from the original document to reduce the document size.

In some embodiments, origin text content is received to be analyzed using natural language processing. For example, an input source document is received for summarization using natural language processing. A two-dimensional item sequence representation for at least a portion of the received origin text content is generated. For example, a two-dimensional N-gram of a portion of the source document is generated. In various embodiments, the represented portion can be based on sentence boundaries. Using one or more processors, one or more evaluation metrics are determined based on an analysis of the two-dimensional item sequence representation. For example, a horizontal evaluation metric can be evaluated for each N-gram row and a vertical evaluation metric can be evaluated using the evaluated horizontal metrics. Based on the one or more evaluation metrics, a reduced version of the origin text content is automatically generated. For example, for each portion of the source document with a two-dimensional N-gram item sequence representation, the evaluated metrics are compared against threshold requirements. In the event the evaluated metrics meet the threshold requirements, the corresponding portion of the source document is included in the reduced version of the original document. Similarly, in the event the evaluated metrics do not meet the threshold requirements, the corresponding portion of the source document is excluded in the reduced version of the original document. In some embodiments, these preprocessing steps are performed to assist in satisfying a constraint of a natural language processing model. For example, the natural language processing model can have a size input constraint, such as a word (or token) count constraint on the input to the natural language processing model. In various embodiments, the tokens used by the natural language processing model can be word-based tokens. In some embodiments, the reduced version of the origin text content is used as an input to the natural language processing model. For example, a natural language processing (NLP) model can be applied to the reduced version of the origin text to generate a summary or abstract of the origin text content. In various embodiments, the generated output can be an extractive or abstractive summary. The result of the natural language processing model is provided for use in managing a computerized workflow. For example, the output from natural language processing can be used to support various services including cloud-based application services such as search engines, providing abstracts of knowledge-based articles, and providing summaries in incident cases, among others.

In various embodiments, the preprocessing techniques disclosed herein are applied to the original document and/or to the output of a previous preprocessing step. In some scenarios, applying multiple preprocessing steps, for example, using a preprocessing pipeline, allows each preprocessing step to identify and remove non-relevant sentences from the original document. Each successive preprocessing step can reduce the size of the original document by identifying additional non-relevant or non-meaningful sentences for removal. In some embodiments, each preprocessing step can be configured to remove different types of non-relevant sentences, such as source code, boilerplate, redundant sentences, etc. In various embodiments, the preprocessing pipeline results in an input document that meets the input document requirements for a downstream natural language processing (NLP) application.

FIG. 1 is a block diagram illustrating an example of a network environment for text summarization. In the example shown, clients 101, 103, and 105 access cloud-based application platform 121 via network 111. Network 111 can be a public or private network. In some embodiments, network 111 is a public network such as the Internet. Application platform 121 hosts cloud services such as a text summarization service for creating abstractive text summaries of provided or referenced content. For example, a document is provided via one of clients 101, 103, and 105 to application platform 121 and a summary of the document is created. The created summary can be hosted by application platform 121 and subsequently accessed by clients such as clients 101, 103, and 105. Examples of content that can be summarized include but are not limited to knowledge-based articles, news articles, research papers, marketing material, financial documents, and email. In various embodiments, the text summarization cloud services offered by application platform 121 are enabled by summarization service platform 125. For example, a text summarization service hosted by application platform 121 can be automated using summarization service platform 125. In various embodiments, summarization service platform 125 can utilize a preprocessing pipeline to reduce the size of an original document prior to using a natural language processing (NLP) application. One or more configured NLP applications of summarization service platform 125 can receive the reduced document, for example, to generate a concise and accurate text summary of the original document. In the example shown, application platform 121 and summarization service platform 125 are both communicatively connected to and utilize database 123. For example, database 123 can store data for cloud services hosted by application platform 121 as well as configuration and content data for summarization service platform 125.

In some embodiments, application platform 121 offers cloud-based application services including a text summarization service for provided content. The provided content to a text summarization service can be provided by clients and/or hosted by application platform 121. For example, content such as knowledge-based articles and email can be stored in database 123 along with corresponding generated summaries of the content. Application platform 121 can utilize the text summarization services of summarization service platform 125 for generating the stored summaries, which can include generated and stored abstractive summaries. In various embodiments, generated summaries can be utilized in additional cloud services offered by application platform 121 such as search services by providing summaries of content accessed by clients.

In some embodiments, summarization service platform 125 is a text summarization platform that provides text summarization services accessible via application platform 121. For example, summarization service platform 125 can process an original document and apply one or more natural language processing (NLP) models to create a text summary. In various embodiments, the summarization service includes a preprocessing pipeline with one or more preprocessing modules. Each preprocessing module can evaluate a provided document and identify sentences for removal. The final result of the preprocessing pipeline is a reduced version of the original document that meets the input size requirements of the downstream NLP model(s). For example, a preprocessing module can remove redundant, non-relevant, and/or non-meaningful sentences from the original document, reducing the original document to meet an input size limitation of an NLP application. In various embodiments, the final result of summarization service platform 125 can be a text summary of a provided document.

Although depicted in FIG. 1 as a single element, summarization service platform 125 may include multiple components including one or more servers such as one or more different text summarization servers, each potentially configured to apply one or more different preprocessing text reduction modules and/or summarization models. Summarization service platform 125 can also include additional components such as a summary service control module for responding to text summary requests. For example, a summary service control module of summarization service platform 125 can select the appropriate text reduction modules and text summarization models for a particular document or document type before generating a text summary. Data used for and by summarization service platform 125 can be retrieved from a data store such as database 123. In some embodiments, the summaries and/or evaluation metrics generated by summarization service platform 125 are stored on a data store such as database 123. In various embodiments, summarization service platform 125 may also include a data management module for managing the document and model data when perform text summarization services.

In some embodiments, database 123 is a data store for supporting application platform 121 and summarization service platform 125. For example, database 123 can store configuration data used by application platform 121 and/or summarization service platform 125 for hosting cloud services and/or text summarization services, respectively. In some embodiments, database 123 is a configuration management database (CMDB) used at least in part for managing assets that are under the management of an organization. In various embodiments, database 123 is used by summarization service platform 125 for storing trained models and/or configurations for applying a preprocessing pipeline and/or natural language processing (NLP) models for text summarization.

Although single instances of some components have been shown to simplify the diagram of FIG. 1, additional instances of any of the components shown in FIG. 1 may also exist. For example, as previously discussed, application platform 121 and/or summarization service platform 125 may include one or more different servers and/or multiple components. As one example, summarization service platform 125 may include multiple instances of different preprocessors of a preprocessing pipeline and multiple natural language processing (NLP) applications configured on and/or implemented using one or more different summarization service servers. Similarly, database 123 may include one or more database servers and may not be directly connected to application platform 121 and/or summarization service platform 125. For example, database 123 and its components may be replicated and/or distributed across multiple servers and/or components. In some embodiments, components not shown in FIG. 1 may also exist.

Figure 2:
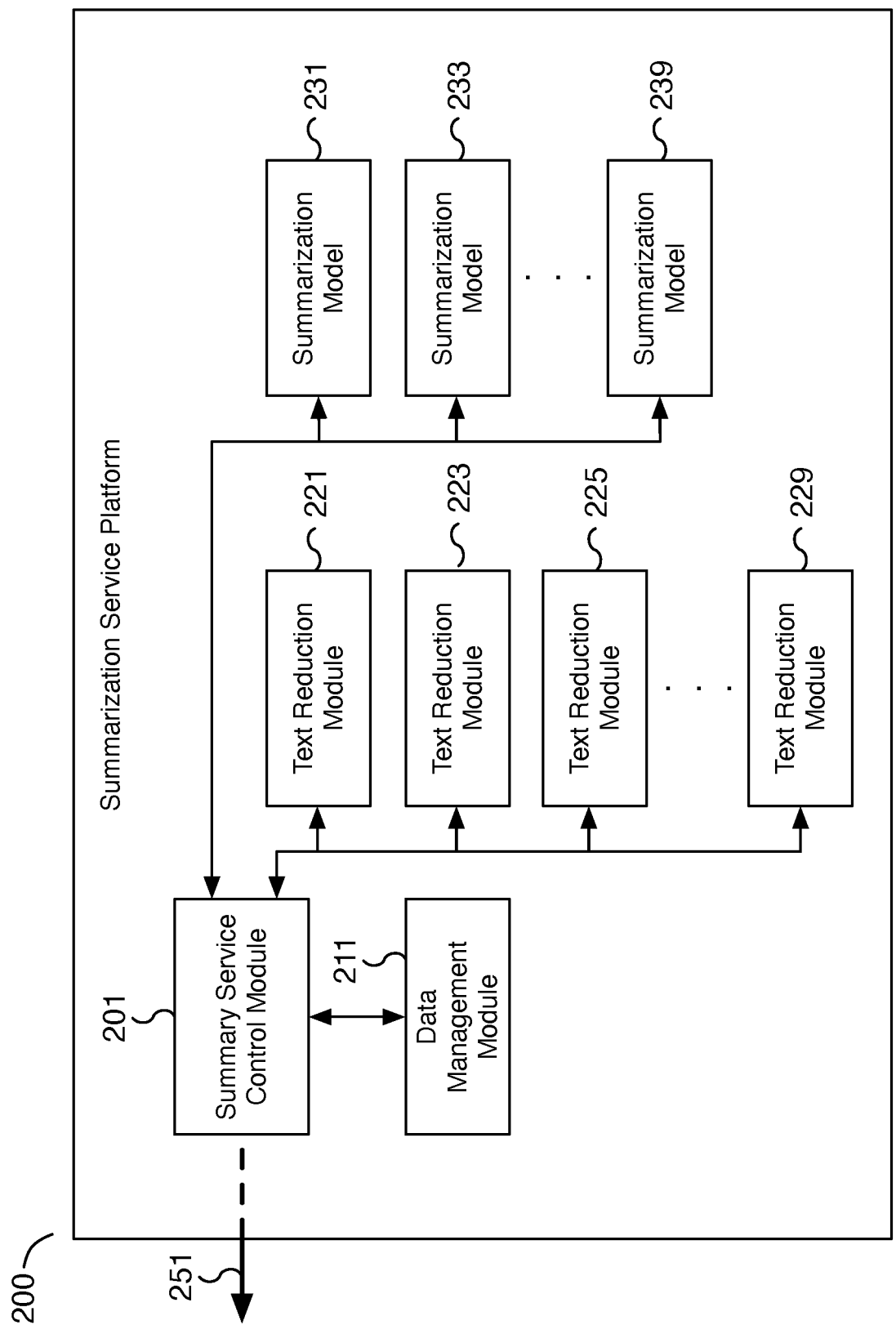
FIG. 2 is a block diagram illustrating an embodiment of a summarization service platform.

FIG. 2 is a block diagram illustrating an embodiment of a summarization service platform. In various embodiments, summarization service platform 200 is utilized for providing text summarization services. In the example shown, summarization service platform 200 includes summary service control module 201, data management module 211, multiple text reduction modules such as text reduction modules 221, 223, 225, and 229, multiple summarization models such as summarization models 231, 233, and 239, and network connection 251. When provided with a request to summarize content, summarization service platform 200 can generate a summary by applying one or more text reduction modules among text reduction modules 221, 223, 225, and 229 as part of a preprocessing pipeline to reduce the original content. Furthermore, one or more summarization models among summarization models 231, 233, and 239 can be applied to the reduced content to create a summary or natural language processing (NLP) result. Summary service control module 201 is utilized to manage and control the summarization service and data management module 211 is used to manage the document and summarization data when applying the various steps of text summarization including preprocessing text reduction steps and/or natural language processing (NLP) steps. In some embodiments, summarization service platform 200 is summarization service platform 125 of FIG. 1 and network connection 251 connects summarization service platform 200 to external components such as application platform 121 and database 123 of FIG. 1.

In some embodiments, summary service control module 201 is a control module for responding to summarization requests received via network connection 251. A summarization request can include a requested document and/or reference to a document to summarize. Additionally, in some embodiments, a summarization request can identify and/or configure one or more text reduction modules to apply and/or one or more summarization models to apply. In some embodiments, summary service control module 201 may be preconfigured to apply the different text reduction modules and summarization models. In some embodiments, summary service control module 201 may automatically determine which text reduction modules and/or summarization models to apply and the appropriate configuration parameters, for example, based on the document type. In various embodiments, summary service control module 201 interfaces with the components of summarization service platform 200 including data management module 211, text reduction modules 221, 223, 225, and 229, and summarization models 231, 233, and 239. For example, summary service control module 201 can manage a preprocessing pipeline of text reduction modules including determining which order to apply the various text reduction modules and negotiating the passing of an output of one text reduction module as the input to another text reduction module. In some embodiments, summary service control module 201 manages providing the reduced document that is the output of the preprocessing pipeline to one or more summarization models and further provides the result of one or more natural language processing summarization models to the client of the summarization request.

In some embodiments, data management module 211 of summarization service platform 200 manages the document and model data when performing text summarization services. For example, data management module 211 can manage the original document received for summarization as well as the different reduced versions of the original document generated by the preprocessing pipeline of text reduction modules. In various embodiments, each text reduction module of the preprocessing pipeline will reduce the size of the original document, for example, by removing sentences, and data management module 211 manages the document data during the different preprocessing stages. Additionally, data management module 211 can manage the document data required to apply one or more summarization models to the final reduced document generated by the preprocessing pipeline. In various embodiments, data management module 211 may also interface with relevant models used by the different text reduction modules and/or summarization models. For example, data management module 211 can provide different models to the various text reduction modules and/or different natural language processing (NLP) summarization models based on the type of the original document and/or the requested summarization configuration. In some embodiments, data management module 211 also manages the importing and/or conversion of the document data from different sources, such as from comma-separated values (CSV) files, extensible markup language (XML) files, plain text files, rich text format (RTF) files, spreadsheets, database tables, and proprietary document formats, among others.

In some embodiments, text reduction modules 221, 223, 225, and 229 are example preprocessing modules for reducing the size of a document. Although four text reduction modules are shown in FIG. 2, fewer or more modules can be utilized by summarization service platform 200. In various embodiments, each text reduction module can be utilized by a preprocessing pipeline where the output of one text reduction module is fed as an input to another text reduction module. Depending on the summarization configuration, different text reduction modules are utilized and the selected text reduction modules may be applied in a different ordering. In various embodiments, each text reduction module can implement a different preprocessing technique and can further be configured and/or trained to remove different types of sentences to reduce the size of the original document. For example, different text reduction modules can identify different sentences that may be redundant, non-relevant, and/or non-meaningful sentences. As an example, text reduction module 221 can implement a labeled cluster preprocessing technique and text reduction module 223 can implement a two-dimensional N-gram preprocessing technique. Additional text reduction modules can implement different preprocessing techniques and can include, as examples, source code block preprocessors to remove different types of non-text fragments, HTML preprocessors to remove and/or replace web links with the appropriate token and/or to process/remove HTML formatting from a document, a minimum sentence filter preprocessor to remove sentences that do not meet minimum threshold requirements, non-ASCII preprocessors to remove non-ASCII characters, and chunk-based preprocessors that split a document into chunks that are summarized and concatenated, among others. The final reduced document generated by the preprocessing pipeline meets the associated size requirements of the relevant summarization models that will be applied to the reduced document.

In some embodiments, summarization models 231, 233, and 239 are example natural language processing (NLP) summarization models that are applied to a reduced document generated by the preprocessing pipeline. Although three summarization models are shown in FIG. 2, fewer or more summarization models can be utilized by summarization service platform 200. Depending on the summarization configuration, different summarization models are utilized, and, in some scenarios, more than one summarization model may be applied. In various embodiments, each summarization model can apply a different trained natural language processing (NLP) model, and different summarization models can encapsulate different model-specific details. In some embodiments, the application of a summary model results in summary sentences, preferred sentence order, sentence position for extractive summaries, and data for scoring metrics. In various embodiments, the applied summarization models can include third-party summarization models and when applied can generate both extractive and abstractive summaries.

Figure 3:
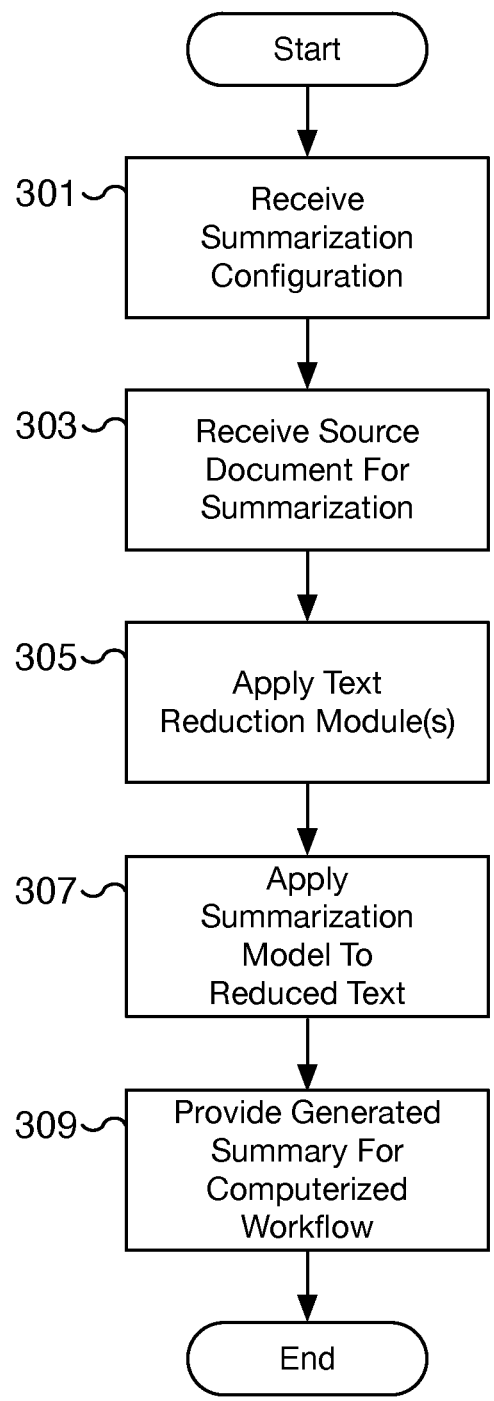
FIG. 3 is a flow chart illustrating an embodiment of a process for summarizing content utilizing a summarization service platform.

FIG. 3 is a flow chart illustrating an embodiment of a process for summarizing content utilizing a summarization service platform. In various embodiments, an original document is provided as the origin text content, and a generated summary is returned by the summarization service platform. The summarization service platform includes a preprocessing pipeline that includes one or more preprocessing text reduction modules to reduce the size of the provided original document to one that meets the requirements of a natural language processing (NLP) summarization model. In some embodiments, the process of FIG. 3 is performed by summarization service platform 125 of FIG. 1 and/or summarization service platform 200 of FIG. 2. For example, access to a summary service can be hosted by an application platform such as application platform 121 of FIG. 1 which utilizes summarization service platform 200 for generating the requested summary. In some embodiments, content for summarization is provided by clients 101, 103, and/or 105 of FIG. 1 and/or by application platform 121 of FIG. 1. In some embodiments, content and/or generated summaries are hosted by application platform 121 and stored in database 123 of FIG. 1. In some embodiments, the text reduction modules are text reduction modules 221, 223, 225, and 229 of FIG. 2, and/or the summarization model is one of summarization models 231, 233, or 239 of FIG. 2. In some embodiments, the control flow of the process of FIG. 3 is controlled by a control module such as summary service control module 201 of FIG. 2 and the document and model data of the summary process is managed by a data management module such as data management module 211 of FIG. 2.

At 301, a summarization configuration is received. In some embodiments, the configuration is received as part of a summarization request initiated by a client to a summarization service platform and/or as part of a configuration process performed on the summarization service platform in advance of receiving summarization requests. In some embodiments, the configuration includes identifying what preprocessing modules to activate in the preprocessing pipeline including what text reduction modules to utilize, the order they should be utilized, and the document limitation requirements of downstream summarization models. Additionally, the configuration includes the downstream summarization models to apply to the reduced document generated by the preprocessing pipeline. In various embodiments, one or more summarization models can be applied and the order of their applications can be configured. In some embodiments, the received configuration includes data model configuration parameters including how to process the source document.

At 303, a source document is received for summarization. For example, a source document that contains the origin text content to be analyzed is received. In various embodiments, the actual source document is received and/or the document can be provided as a reference that is retrieved, for example, by a data management module of the summarization service platform. In some embodiments, the supported document formats include a variety of different formats including comma-separated values (CSV) files, extensible markup language (XML) files, plain text files, rich text format (RTF) files, spreadsheets, database tables, and proprietary document formats, among others. At 303, the source document is received including by issuing queries to the referenced sources for the document, such as a datastore or database tables. Additionally, the required translation is performed on the document to translate the document into a format that can be accepted by the preprocessing pipeline. Example documents can include case data from incident tickets, knowledge-based articles, data from log files, email threads, news articles, research papers, marketing material, and financial documents, among others.

At 305, one or more text reduction modules are applied. For example, the configured text reduction modules are applied as part of a preprocessing pipeline to reduce the original source document to a document that meets the input requirements of one or more summarization models. Typically, summarization models have input size requirements and the preprocessing pipeline can reduce the original source document to the required size, such as 500 or 1000 words (or tokens), as required. In various embodiments, the different preprocessing text reduction modules can identify and remove redundant, non-relevant, and non-meaningful sentences. The text reduction modules can implement different preprocessing techniques including different labeled clustering, two-dimensional N-gram, source code block, HTML, minimum sentence filter, non-ASCII, and chunk-based preprocessing techniques. In some embodiments, the preprocessing is performed on at least a portion of the source document or origin text content. For example, the preprocessing can be performed on one or more sentences of the origin text content.

At 307, a summarization model is applied to the reduced text. For example, a natural language processing (NLP) summarization model is applied to the reduced text generated by the text reduction module(s) applied at 305. In various embodiments, the application of a summary model results in summary sentences, preferred sentence order, sentence position for extractive summaries, and data for scoring metrics. By applying a summarization model, a summary can be generated for the original source document received at 303. In some embodiments, multiple summarization models are applied, for example, successively or in parallel, to optimize the summarization result. For example, different summarization models can be applied to generated different summaries and the best summary is selected by evaluating the different generated summaries. In some embodiments, the applied summarization models can include third-party summarization models and when applied can generate both extractive and abstractive summaries.

At 309, the generated summary is provided for a computerized workflow. For example, the summary generated at 307 is provided to a requesting client of an application service incorporating the summarization service platform as part of a computerized workflow. In some embodiments, the summary is provided for use in managing the computerized workflow. For example, a computerized workflow can include incident tracking, infrastructure management, human-resources feedback intake, and other cloud-based application workflow services that utilize search engines, abstracts of knowledge-based articles, and summaries in incident cases, among others. In some embodiments, the summary may be written back to a data store such as a database table. In various embodiments, the generated summary is provided along with metrics associated with the summary such as evaluation metrics.

Using the process of FIG. 3, the best candidate summarizer of a group of different candidate summarizers is selected and utilized to generate a summary for provided content. In some embodiments, the generated summary is an abstractive summary that retains much of the accuracy of an extractive summary. In some embodiments, the process of FIG. 3 is performed by summarization service platform 125 of FIG. 1 and/or summarization service platform 200 of FIG. 2. For example, access to a summary service can be hosted by an application platform such as application platform 121 of FIG. 1 which utilizes summarization service platform 200 for generating the requested summary. In some embodiments, content for summarization is provided by clients 101, 103, and/or 105 of FIG. 1 and/or by application platform 121 of FIG. 1. In some embodiments, generated summaries are hosted by application platform 121 and stored in database 123 of FIG. 1.

Figure 4A:
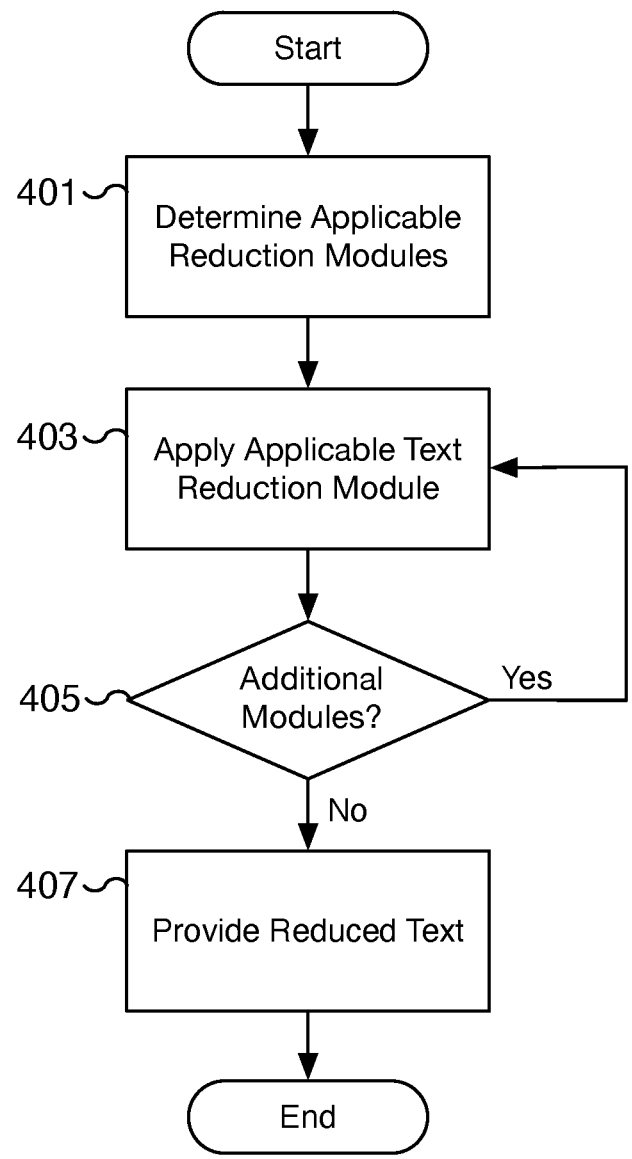
FIG. 4A is a flow chart illustrating an embodiment of a process performed by a preprocessing pipeline to reduce the size of a document.

FIG. 4A is a flow chart illustrating an embodiment of a process performed by a preprocessing pipeline to reduce the size of a document. For example, the process of FIG. 4A is performed by a preprocessing pipeline of a summarization service platform to reduce the size of a source document, such as the number of words or tokens of the document, to meet the input requirements of a natural language process (NLP) summarization model. In some embodiments, the process of FIG. 4A is performed at 305 of FIG. 3 by a summarization service platform such as summarization service platform 125 of FIG. 1 and/or summarization service platform 200 of FIG. 2 using one or more text reduction models of a preprocessing pipeline. In some embodiments, the text reduction modules are text reduction modules 221, 223, 225, and 229 of FIG. 2. In some embodiments, the control flow of the process of FIG. 4A is controlled by a control module such as summary service control module 201 of FIG. 2 and the document and model data of the summary process is managed by a data management module such as data management module 211 of FIG. 2.

At 401, the applicable text reduction modules are determined. For example, the specific text reduction modules to apply to a source document and the order of their application is determined. In some embodiments, the configuration is determined and provided as part of a request to a summarization service. In some embodiments, the configuration is preconfigured and/or determined automatically, for example, based on the document type and/or by analyzing the document to determine characteristics of the document that match the available text reduction modules. In various embodiments, the different applicable text reduction modules make up a pipeline of preprocessing modules that are applied sequentially. For example, the output of one text reduction module is fed as the input to the next text reduction module. Each applied text reduction module of the preprocessing pipeline can further reduce the document size, for example, by identifying and removing different sentences from the original document.

At 403, an applicable text reduction module is applied. For example, the output from the previous text reduction module (or the original source document in the event the current text reduction module is the first of the preprocessing pipeline) is fed as input to the current applicable text reduction module. In various embodiments, the applied text reduction module identifies sentences that can be removed from the input document. In various embodiments, the different applicable reduction modules utilize different preprocessing technologies to identify different types of sentences that can be removed. The identified sentences can be redundant, non-relevant, and/or non-meaningful sentences. Once identified, a reduced document is generated and provided as the output of step 403. The reduced document may be provided to a downstream stage of the summarization service or as input to the next text reduction module in the preprocessing pipeline in the event an additional text reduction module is to be applied. In various embodiments, the applicable text reduction module can implement one of many different preprocessing techniques that include labeled clustering, two-dimensional N-gram, source code block, HTML, minimum sentence filter, non-ASCII, and chunk-based preprocessing techniques, among others.

At 405, a determination is made whether additional applicable text reduction modules remain to be applied as part of the preprocessing pipeline. In the event additional applicable text reduction modules remain to be applied, processing loops back to 403 where the next text reduction module is applied to the output of the previous text reduction module. In the event no additional applicable text reduction modules remain to be applied, processing proceeds to 407.

At 407, the reduced text is provided. For example, the reduced text is provided to a subsequent stage of a summarization service. Typically, the next stage of the summarization service utilizes the reduced text as input to a natural language processing (NLP) summarization model that has input document requirements matching the reduced text provided at 407. For example, the preprocessing pipeline applied as part of the process of FIG. 4A can reduce the number of words (or tokens) of the original document to one that matches the input word (or token) limit of a downstream natural language processing (NLP) summarization model.

Figure 4B:
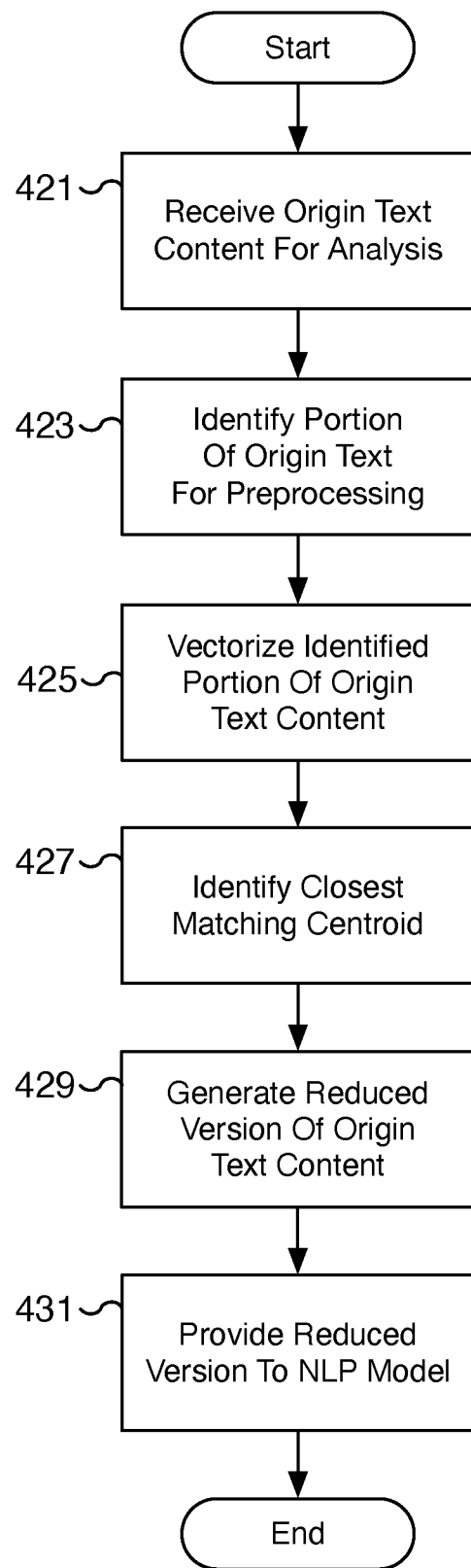
FIG. 4B is a flow chart illustrating an embodiment of a process for summarizing content using a labeled clustering preprocessing technique.

FIG. 4B is a flow chart illustrating an embodiment of a process for summarizing content using a labeled clustering preprocessing technique. For example, the process of FIG. 4B is performed by a summarization service platform with a preprocessing pipeline that includes a text reduction preprocessing module. The text reduction module applies labeled clustering using a preprocessing technique to reduce the size of the received origin text content before providing a reduced version of the origin text content to a natural language process (NLP) summarization model. In some embodiments, the process of FIG. 4B is performed by a summarization service platform such as summarization service platform 125 of FIG. 1 and/or summarization service platform 200 of FIG. 2 using a text reduction model of a preprocessing pipeline. In some embodiments, the text reduction module is one of text reduction modules 221, 223, 225, or 229 of FIG. 2. In some embodiments, the control flow of the process of FIG. 4B is controlled by a control module such as summary service control module 201 of FIG. 2 and the document and model data of the summary process is managed by a data management module such as data management module 211 of FIG. 2. In some embodiments, step 421 is performed at 303 of FIG. 3, steps 423, 425, 427, and/or 429 are performed at 305 of FIG. 3, and/or step 431 is performed at 307 of FIG. 3. In various embodiments, the process of FIG. 4B is performed at 403 and/or at 407 of FIG. 4A.

At 421, origin text content is received for analysis. For example, a source or input document that contains the origin text content to be analyzed is received. In various embodiments, the actual source document is received and/or the document can be provided as a reference that is retrieved, for example, by a data management module of the summarization service platform. In some embodiments, the supported document formats include a variety of different formats including comma-separated values (CSV) files, extensible markup language (XML) files, plain text files, rich text format (RTF) files, spreadsheets, database tables, and proprietary document formats, among others.

At 423, a portion of the origin text content is identified for preprocessing. For example, a portion of the origin text content is identified for preprocessing in an attempt to determine whether the portion of the identified text can be excluded from a reduced version of the origin text content. In some embodiments, the portion identified is based on a delimiter such as sentence, paragraph, word length, token length, or another delimiter. For example, a parser can identify sentence boundaries and split the origin text content into sentence portions. Each sentence can be processed using the process of FIG. 4B to determine whether or not to include the identified sentence portion in the reduced version of the origin text content.

At 425, the identified portion of the origin text content is vectorized. For example, the identified portion is vectorized using a sentence embedding technique such as by using one or more universal sentence encoders. In various embodiments, the same vectorization technique is used to train a set of labeled centroids.

At 427, the closest matching centroid is identified. Using a set of labeled centroids, the closest matching centroid is identified. For example, using a sentence portion of the origin text content, the vector of the sentence vectorized at 425 is compared to the labeled centroids and the closest centroid sentence is identified. In various embodiments, the labeled centroids are stored using the same vectorized format utilized at 427.

At 429, a reduced version of the origin text content is generated. For example, a reduced version of the origin text content is automatically generated using the closest matching centroid identified at 427. In various embodiments, a determination can be made whether to include or exclude the portion being preprocessed in or from the reduced version of the origin text content. In some embodiments, each labeled centroid is labeled with a directive to either include or exclude matches. For example, in the event the closest matching centroid is labeled as relevant (or include), the portion identified at 423 is included in the reduced version of the origin text content. In contrast, in the event the closest matching centroid is labeled as non-relevant (or exclude), the portion identified at 423 is excluded from the reduced version of the origin text content. In various embodiments, the portions not analyzed using the process of FIG. 4B may be included or excluded from the reduced version of the origin text content as appropriate. For example, the non-analyzed portions may by default be included and may only be excluded (either fully or partially) by a different preprocessing step or pass when they are analyzed. As another example, the non-analyzed portions may by default be excluded unless explicitly included by a different preprocessing step or pass. In various embodiments, the reduced version that is generated meets one or more constraints of a natural language processing (NLP) model.

At 431, the reduced version of the origin text content is provided to a natural language processing (NLP) model. In various embodiments, the reduced version of the origin text content meets a constraint of the model such as a size constraint. In various embodiments, the size constraint can be a word or token limit or another size limit and requires reducing the origin text content to the size of the reduced version generated at 429.

Figure 4C:
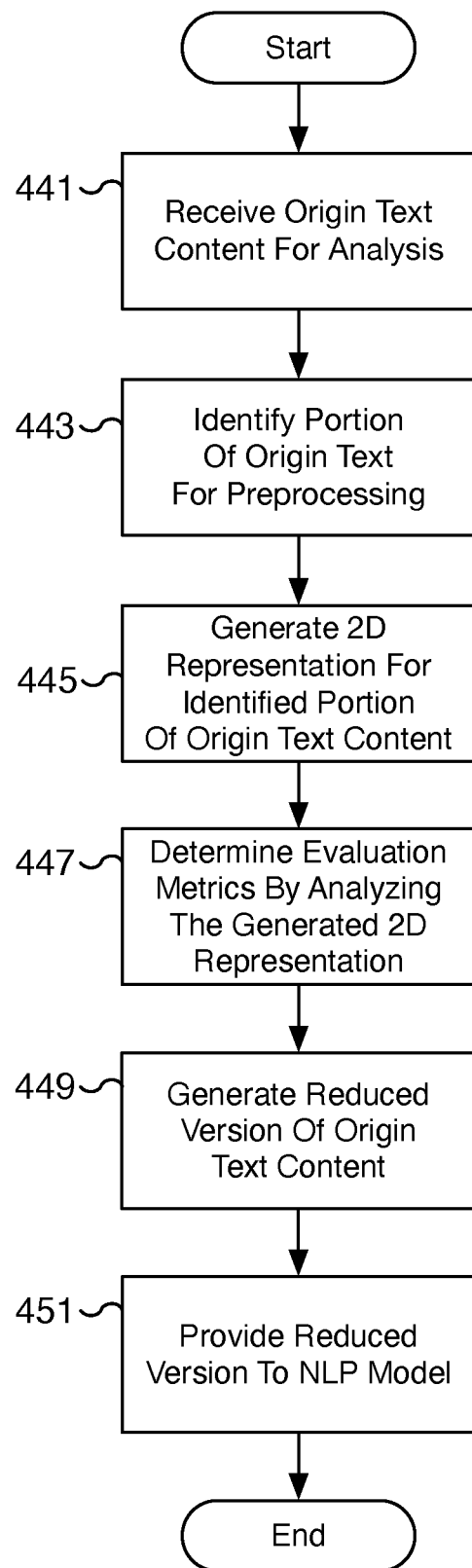
FIG. 4C is a flow chart illustrating an embodiment of a process for summarizing content using a two-dimensional item sequence preprocessing technique.

FIG. 4C is a flow chart illustrating an embodiment of a process for summarizing content using a two-dimensional item sequence preprocessing technique. For example, the process of FIG. 4C is performed by a summarization service platform with a preprocessing pipeline that includes a text reduction preprocessing module. The text reduction module applies a two-dimensional item sequence preprocessing technique to reduce the size of the received origin text content before providing a reduced version of the origin text content to a natural language process (NLP) summarization model. In some embodiments, the process of FIG. 4C is performed by a summarization service platform such as summarization service platform 125 of FIG. 1 and/or summarization service platform 200 of FIG. 2 using a text reduction model of a preprocessing pipeline. In some embodiments, the text reduction module is one of text reduction modules 221, 223, 225, or 229 of FIG. 2. In some embodiments, the control flow of the process of FIG. 4C is controlled by a control module such as summary service control module 201 of FIG. 2 and the document and model data of the summary process is managed by a data management module such as data management module 211 of FIG. 2. In some embodiments, step 441 is performed at 303 of FIG. 3, steps 443, 445, 447, and/or 449 are performed at 305 of FIG. 3, and/or step 451 is performed at 307 of FIG. 3. In various embodiments, the process of FIG. 4C is performed at 403 and/or at 407 of FIG. 4A.

At 441, origin text content is received for analysis. For example, a source or input document that contains the origin text content to be analyzed is received. In various embodiments, the actual source document is received and/or the document can be provided as a reference that is retrieved, for example, by a data management module of the summarization service platform. In some embodiments, the supported document formats include a variety of different formats including comma-separated values (CSV) files, extensible markup language (XML) files, plain text files, rich text format (RTF) files, spreadsheets, database tables, and proprietary document formats, among others.

At 443, a portion of the origin text content is identified for preprocessing. For example, a portion of the origin text content is identified for preprocessing in an attempt to determine whether the portion of the identified text can be excluded from a reduced version of the origin text content. In some embodiments, the portion identified is based on a delimiter such as sentence, paragraph, word length, token length, or another delimiter. For example, a parser can identify sentence boundaries and split the origin text content into sentence portions. Each sentence can be processed using the process of FIG. 4C to determine whether or not to include the identified sentence portion in the reduced version of the origin text content.

Figure 10:
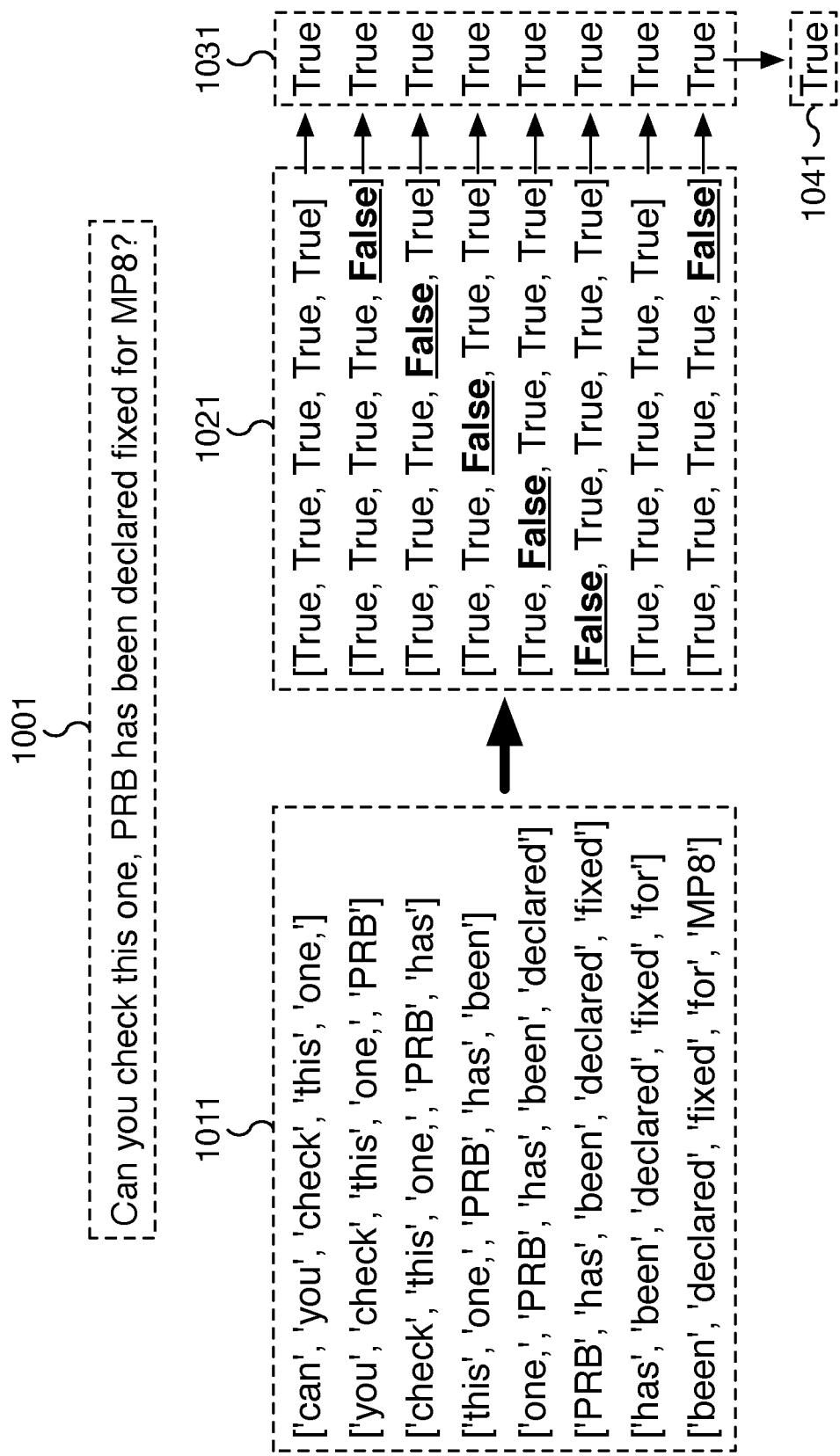
FIG. 10 is a diagram illustrating an example sentence and its corresponding two-dimensional N-gram and evaluated results when applying a two-dimensional N-gram preprocessing technique.

At 445, a two-dimensional item sequence representation is generated for the identified portion of the origin text content. For example, a two-dimensional item sequence representation of the portion identified at 443 is generated. In some embodiments, the two-dimensional item sequence representation is a two-dimensional N-gram representation of the identified portion. The two-dimensional N-gram item sequence representation is composed of rows, where each of the rows includes a different consecutive sequence of items from the identified portion of the origin text content. In various embodiments, each row includes the same N number of items from the identified portion of the origin text content. In some embodiments, the first row of the two-dimensional item sequence representation includes the beginning consecutive N items of the identified portion and the last row of the two-dimensional item sequence representation includes the last N consecutive items of the identified portion. In various embodiments, the items included are word items although other item units may be appropriate as well. In some embodiments, two-dimensional N-gram 1011 of FIG. 10 is an example of a generated two-dimensional N-gram item sequence, where the portion identified at 443 is a sentence and the item units are words.

At 447, evaluation metrics are determined by analyzing the generated two-dimensional representation. For example, evaluation metrics are performed along the horizontal and vertical dimensions of the two-dimensional item sequence representation. In some embodiments, each item of a row is evaluated to determine a row (or horizontal) metric. Using the evaluated row metrics, a vertical evaluation metric is determined for the identified portion of the origin text content. In some embodiments, each item of a row can be evaluated by using an evaluation dictionary. For example, word items can be looked up in a dictionary to determine their evaluated value. For an entire row, the evaluation metric can be determined based on the evaluated item values.

At 449, a reduced version of the origin text content is generated. For example, a reduced version of the origin text content is automatically generated using the evaluation metrics determined at 427. In various embodiments, a determination can be made whether to include or exclude the portion being preprocessed in or from the reduced version of the origin text content. In some embodiments, the evaluation metrics determined at 447 indicate whether to include or exclude an evaluated portion of the origin text content. For example, the evaluated metrics can be compared to evaluation threshold values. In the event the evaluation metrics determined at 447 meet the evaluation thresholds, the portion identified at 423 is included in the reduced version of the origin text content. In contrast, in the event the evaluation metrics determined at 447 do not meet the evaluation thresholds, the portion identified at 423 is excluded from the reduced version of the origin text content. In various embodiments, the portions not analyzed using the process of FIG. 4C may be included or excluded from the reduced version of the origin text content as appropriate. For example, the non-analyzed portions may by default be included and may only be excluded (either fully or partially) by a different preprocessing step or pass when they are analyzed. As another example, the non-analyzed portions may by default be excluded unless explicitly included by a different preprocessing step or pass. In various embodiments, the reduced version that is generated meets one or more constraints of a natural language processing (NLP) model.

At 451, the reduced version of the origin text content is provided to a natural language processing (NLP) model. In various embodiments, the reduced version of the origin text content meets a constraint of the model such as a size constraint. In various embodiments, the size constraint can be a word or token limit or another size limit and requires reducing the origin text content to the size of the reduced version generated at 449.

Figure 5:
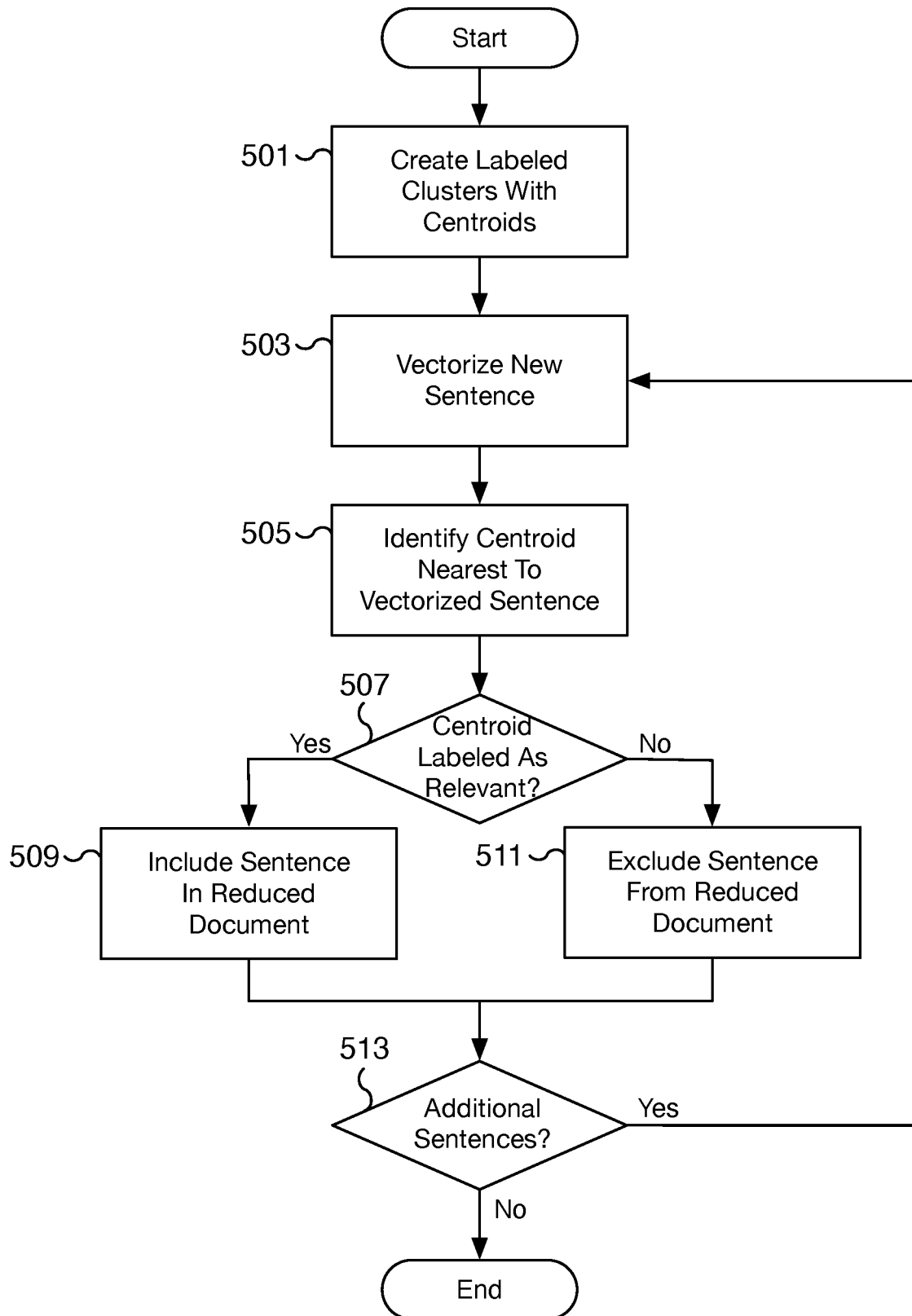
FIG. 5 is a flow chart illustrating an embodiment of a process for performing text reduction using a labeled clustering preprocessing technique.

FIG. 5 is a flow chart illustrating an embodiment of a process for performing text reduction using a labeled clustering preprocessing technique. For example, a provided document can be reduced in size by identifying non-relevant or junk sentences using labeled clustering. In various embodiments, the process of FIG. 5 is performed on an input document by a text reduction unit that is part of a preprocessing pipeline for text summarization. The process of FIG. 5 generates a reduced version of the input document. For example, a reduced text document is generated by the process of FIG. 5 that has fewer sentences and thus fewer words (or tokens) compared to the input document. In some embodiments, the process of FIG. 5 is performed at 305 of FIG. 3, at 403 of FIG. 4A, and/or at 423, 425, 427, and/or 429 of FIG. 4B by a text reduction module. In some embodiments, the text reduction module is part of summarization service platform 125 of FIG. 1 and/or summarization service platform 200 of FIG. 2. In some embodiments, the process of FIG. 5 is performed by text reduction modules 221, 223, 225, and/or 229 of FIG. 2. In some embodiments, the control flow of the process of FIG. 5 including what input data is received by the text reduction module is controlled by a control module such as summary service control module 201 of FIG. 2 and the document and labeled data is managed by a data management module such as data management module 211 of FIG. 2.

At 501, labeled clusters with centroids are created. For example, training data associated or related to the input document is used to create labeled clusters, where each cluster is labeled as relevant or non-relevant. Using the centroid of each cluster as representative of the cluster, the centroid and cluster label are stored and used to analyze the sentences of the input document. For example, each centroid sentence is stored along with a relevant or non-relevant label. In various embodiments, the training data is selected based on its similarity to the input document. For example, for an input document that is a knowledge-based article, similar knowledge-based articles are used to create the labeled clusters.

At 503, a new sentence from the input document is vectorized. For example, a sentence from the input document is extracted and vectorized using the same vectorization technique applied to the training data at 501. In some embodiments, the vectorized sentence is created using a sentence embedding technique. In some embodiments, the sentence embedding technique utilizes one or more universal sentence encoders.

At 505, the centroid sentence nearest to the vectorized sentence is identified. For example, the vector of the new sentence vectorized at 503 is compared to the labeled centroids created at 501 and the closest centroid sentence is identified. By identifying the closest centroid sentence, the (relevant or non-relevant) label associated with the centroid and its cluster are also identified. In various embodiments, with respect to the training data used in 501, the vectorized sentence most closely matches the identified centroid sentence and is most closely associated with the relevance assigned to the cluster.

In some embodiments, prior to identifying the closest matching centroid, a labeled centroid dataset is selected from multiple sets of labeled centroid datasets. For example, different labeled centroid datasets can exist, and the most appropriate labeled centroid dataset is selected and used to evaluate the input document. Depending on the usage scenario, different datasets may be appropriate. As an example, a labeled centroid dataset trained using human-resource articles can be used for human resource documents and a labeled centroid dataset trained using knowledge-based articles can be used for knowledge-based documents. In some embodiments, the selected dataset is based on a property of the input document, such as file type, author(s), readers, viewers, subject matter, and storage location, among other properties. For example, different labeled centroid datasets can be used based on the file type of the input document and/or where the input document is stored, such as in a database and/or in a particular database location or table. In some embodiments, the selected labeled centroid dataset is configured as part of the summarization request.

At 507, a determination is made whether the identified nearest centroid is labeled as relevant. In the event the identified nearest centroid is labeled as relevant, processing proceeds to 509. In the event the identified nearest centroid is labeled as non-relevant, processing proceeds to 511.

At 509, the current sentence is included in the reduced document. For example, the current sentence most closely matches a centroid sentence that is labeled as relevant. By association, the current sentence is also considered relevant and is included in the reduced document. In following the label assigned to the closest matching centroid sentence, the current sentence is included in the reduced document based on the relevancy evaluation associated with the closest matching centroid.

At 511, the current sentence is excluded from the reduced document. For example, the current sentence most closely matches a centroid sentence that is labeled as non-relevant (or junk). By association, the current sentence is also identified as non-relevant (or junk) and is excluded from the reduced document. By removing the sentence from the input document, the reduced document contains fewer words (as well as fewer tokens). In following the label assigned to the closest matching centroid sentence, the current sentence is excluded in the reduced document based on the relevancy evaluation associated with the closest matching centroid.

At 513, a determination is made whether additional sentences exist for processing. In the event additional sentences exist for analysis, processing loops back to 503 where the next sentence is vectorized and analyzed for relevance. In the event no additional sentences exist for processing, the preprocessing of the document using labeled clustering completes. For example, the entire document has been analyzed for relevant sentences and the identified non-relevant sentences have been removed from the input document. The reduced document is then provided as an output of the process of FIG. 5.

Figure 6:
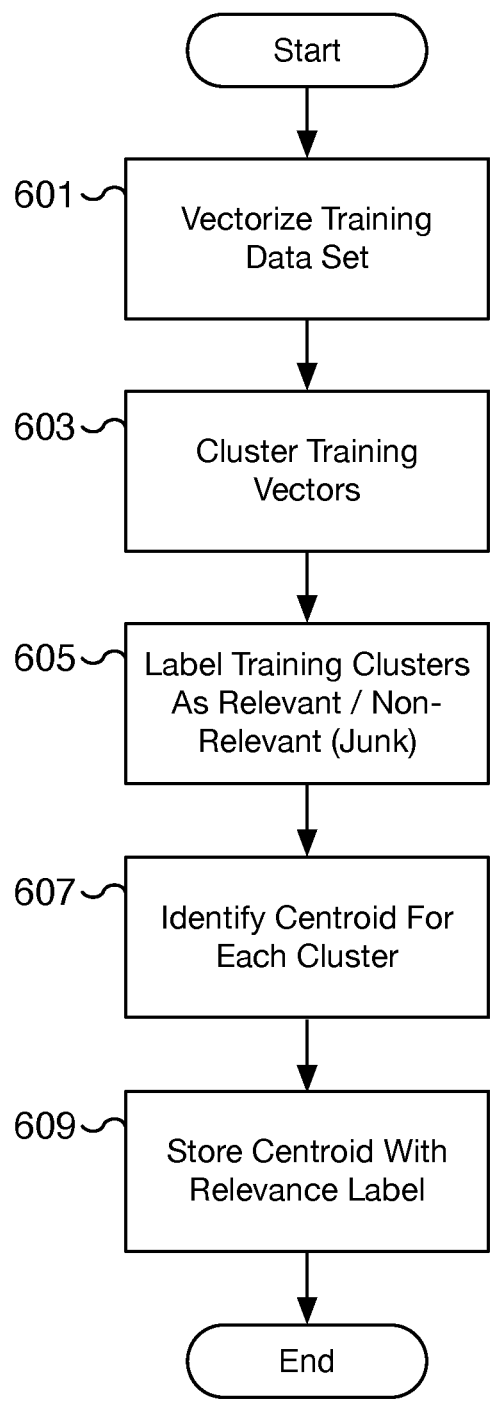
FIG. 6 is a flow chart illustrating an embodiment of a process for creating labeled clusters with centroids.

FIG. 6 is a flow chart illustrating an embodiment of a process for creating labeled clusters with centroids. For example, the process of FIG. 6 is used to create labeled centroids for determining the relevance of sentences as part of a labeled clustering preprocessing technique. In some embodiments, the process of FIG. 6 is performed on multiple different sets of training data. Based on the input document provided for summarization, different trained results are used. For example, for a given input document, the labeled centroids trained using a dataset that most closely matches the input document are selected for analyzing the input document. In some embodiments, the training process of FIG. 6 is performed in advance of applying a text reduction module that is part of a preprocessing step for text summarization. For example, at the time of applying the preprocessing step to an input document for text summarization, the best trained labeled centroid data generated by the process of FIG. 6 is used. In some embodiments, the process of FIG. 6 is performed by a summarization service platform such as summarization service platform 125 of FIG. 1 and/or summarization service platform 200 of FIG. 2. In some embodiments, the process of FIG. 6 is performed by a text reduction module such as one or more of text reduction modules 221, 223, 225, and/or 229 of FIG. 2. In some embodiments, the control flow of the process of FIG. 6 including determining the training input data to supply to the text reduction module for training is controlled by a control module such as summary service control module 201 of FIG. 2 and the training and labeled centroid data is managed by a data management module such as data management module 211 of FIG. 2. In some embodiments, the process of FIG. 6 is performed at 501 of FIG. 5.

At 601, a training data set is vectorized. For example, each sentence from a supplied training data set is vectorized. In some embodiments, the vectorized sentences are created using a sentence embedding technique. In some embodiments, the sentence embedding technique utilizes one or more universal sentence encoders. In various embodiments, each training data set includes a sufficient number of sentences for a document domain. For example, a training data set may include 76k or more sentences.

At 603, the training sentence vectors are clustered. For example, the sentence vectors generated at 601 are assigned into clusters. In some embodiments, a K-Means clustering technique is applied to the embedded sentence vectors. The hyperparameter K can be selected based on the number or total count of sentences. In some embodiments, the hyperparameter K is selected based on the square root of the number or total count of sentences. For example, for a training data set of 76k sentences, a hyperparameter K can be set to 277 based on the square root of 76k. In various embodiments, each sentence is assigned to at least a single cluster or to at most a single cluster.

At 605, the training clusters are labeled as either relevant or non-relevant (junk). For example, each cluster is analyzed and labeled as either relevant or non-relevant by applying a relevance evaluation. In various embodiments, a non-relevant label has the same meaning as a junk label. For example, a non-relevant sentence is also a junk sentence and does not add additional value to the original document. In some embodiments, the clusters are labeled manually by evaluating one or more sentences for each cluster. For example, the relevance evaluation for each cluster can be performed by manually labeling each cluster.

At 607, a centroid for each cluster is identified. For example, a centroid sentence is identified for each labeled cluster. In some embodiments, the identified centroid sentence is representative of the sentences in the cluster. In some embodiments, a resolution process is performed to ensure that in the event multiple centroids are identical, the labels assigned to the matching centroids do not result in a conflict.

At 609, the identified centroid is stored with its relevance label. For example, each identified centroid and the label of its cluster are stored. A cluster labeled relevant is stored using the centroid sentence and relevant label pair. Similarly, a cluster labeled non-relevant (or junk) is stored using the centroid sentence and non-relevant (or junk) label pair. In some embodiments, the centroid sentence is stored as a vector using a vector format. When completed, the trained data is a set of centroid and relevance label pairs. For example, for a training dataset of 76k sentences, a set of 277 pairs of centroid sentences and associated relevance labels is created.

Figure 7A:
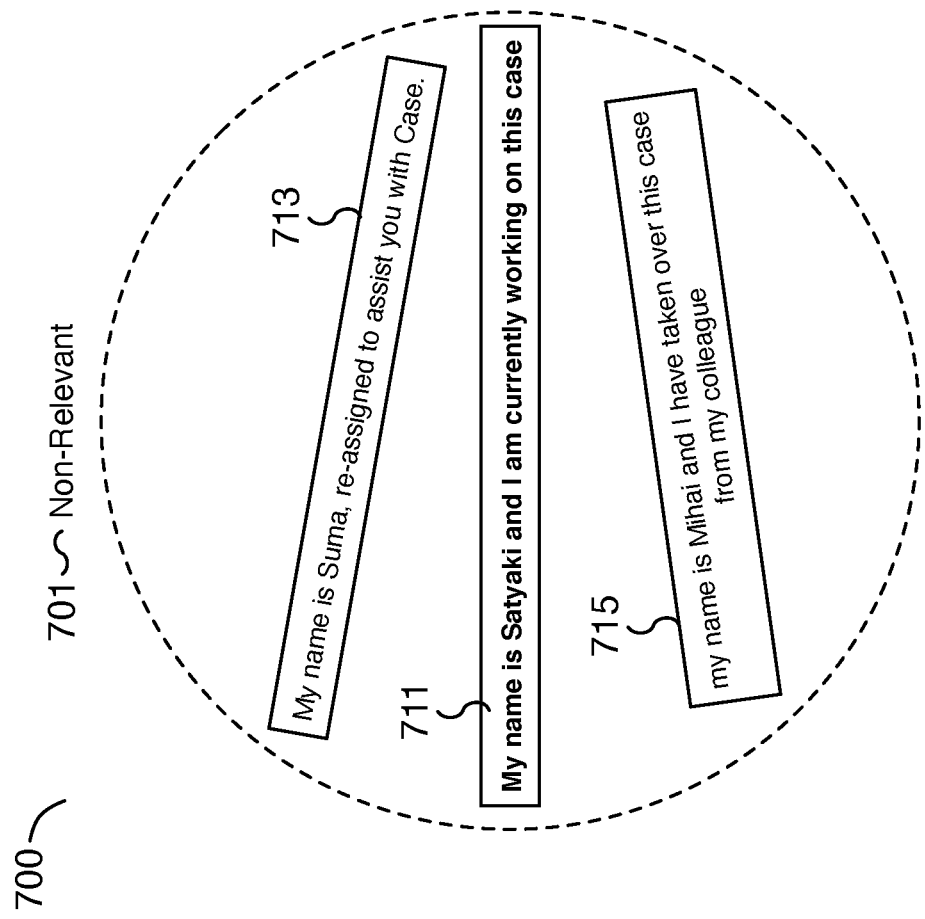
FIGS. 7A and 7B are diagrams illustrating example labeled clusters of sentences with identified centroid sentences.
Figure 7B:
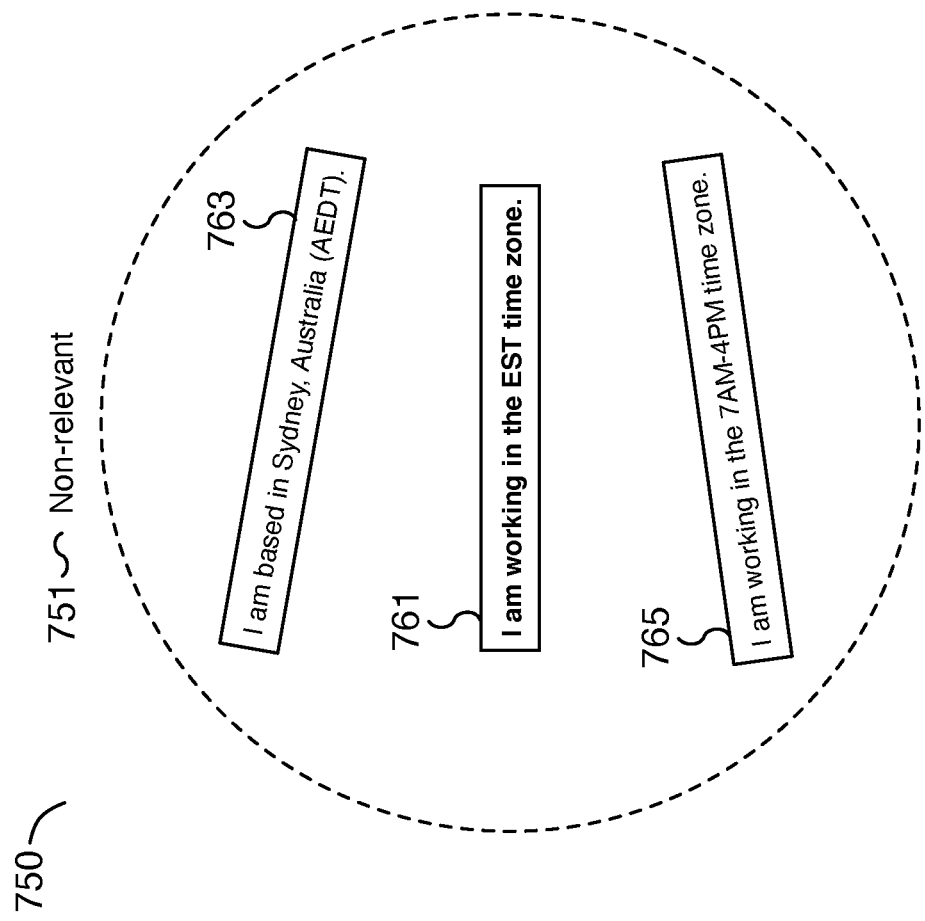

FIGS. 7A and 7B are diagrams illustrating example labeled clusters of sentences with identified centroid sentences. In the examples shown, cluster 700 of FIG. 7A and cluster 750 of FIG. 7B are generated from the same training data set of sentences. Additional clusters are also generated and labeled with their corresponding identified centroids but are not shown. The sentences within each of cluster 700 and 750 are assigned to their respective cluster based on the meaning of each sentence. The sentences of cluster 700 relate to the identity of a responsible party for a case and the sentences of cluster 750 relate to identifying a time zone. Both cluster 700 and cluster 750 are labeled as non-relevant.

In the example shown, cluster 700 of FIG. 7A is a cluster of sentences with label 701. Cluster 700 includes three sentences, centroid sentence 711 in bold and additional sentences 713 and 715. As shown with label 701, cluster 700 is labeled as "non-relevant." The included sentences, centroid sentence 711 ("My name is Satyaki and I am currently working on this case"), sentence 713 ("My name is Suma, re-assigned to assist you with Case."), and sentence 715 ("my name is Mihai and I have taken over this case from my colleague") are assigned to the same cluster 700 based on a K-Means clustering technique. Although the contents of each sentence are meaningful (identifying the responsible party), the sentences are not relevant for generating a text summary for an input document. Similar to cluster 700 of FIG. 7A, cluster 750 of FIG. 7B is a cluster of sentences with label 751. Cluster 750 also includes three sentences, centroid sentence 761 in bold and additional sentences 763 and 765. As shown with label 751, cluster 750 is also labeled as "non-relevant." The included sentences, centroid sentence 761 ("I am working in the EST time zone."), sentence 763 ("I am based in Sydney, Australia (AEDT)."), and sentence 765 ("I am working in the 7 AM-4 PM time zone.") are assigned to the same cluster 750 based on a K-Means clustering technique. Although the contents of each sentence are meaningful (identifying a time zone), the sentences are not relevant for generating a text summary for an input document.

In various embodiments, the example clusters 700 and 750 are generated using the process of FIG. 6. Once the clusters are generated, the clusters are labeled, a centroid sentence for each cluster is identified, and the centroid sentence and label of each cluster are stored together as a pair. For example, for cluster 700, centroid sentence 711 and label 701 are stored together. Similarly, for cluster 750, centroid sentence 761 and label 751 are stored together. In various embodiments, the centroid sentence is stored in a vectorized format. When a new sentence is processed using the labeled clustering preprocessing technique described with respect to FIG. 5, the new sentence is vectorized and compared to the identified centroids. The new sentence is then assigned the relevance label of the closest matching centroid. For example, the new sentence "I am working in the US Eastern time zone." is vectorized and matches centroid sentence 761 ("I am working in the EST time zone."). Since centroid sentence 761 is stored along with non-relevant label 751, the new sentence is also identified as non-relevant and can be excluded from an original document when generating a reduced version of the document.

Figure 8:
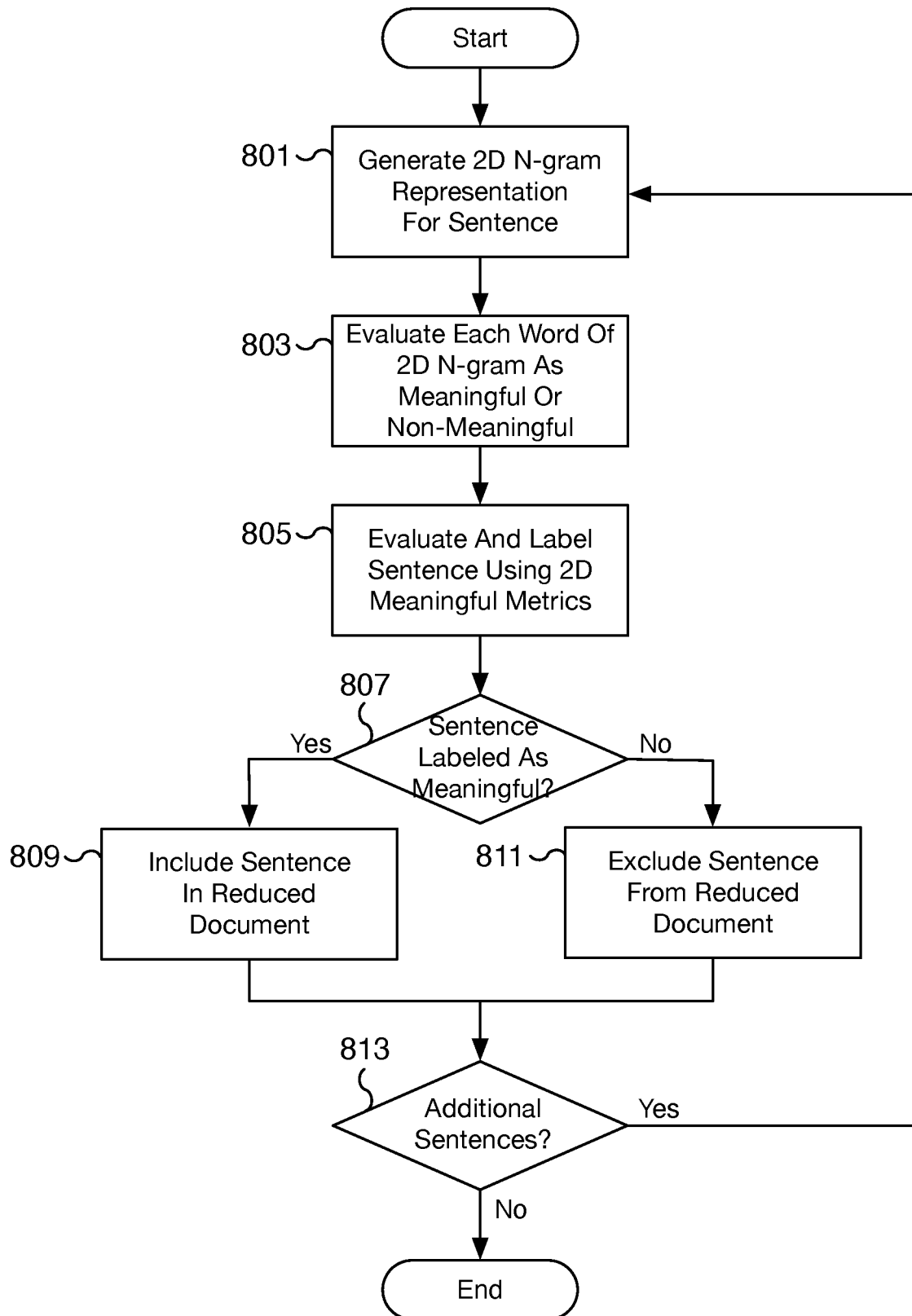
FIG. 8 is a flow chart illustrating an embodiment of a process for performing text reduction using a two-dimensional N-gram preprocessing technique.

FIG. 8 is a flow chart illustrating an embodiment of a process for performing text reduction using a two-dimensional N-gram preprocessing technique. For example, a provided document can be reduced in size by analyzing each sentence of the document using a two-dimensional N-gram of the sentence to identify meaningful and non-meaningful sentences. Only sentences found to be meaningful are included in the reduced version of the input document. The generated reduced document has fewer sentences and thus fewer words (or tokens) compared to the input document. In some embodiments, the process of FIG. 8 is performed at 305 of FIG. 3, at 403 of FIG. 4A, and/or at 443, 445, 447, and/or 449 of FIG. 4C by a text reduction module. In some embodiments, the text reduction module is part of summarization service platform 125 of FIG. 1 and/or summarization service platform 200 of FIG. 2. In some embodiments, the process of FIG. 8 is performed by text reduction modules 221, 223, 225, and/or 229 of FIG. 2. In some embodiments, the control flow of the process of FIG. 8 including what input data is received by the text reduction module is controlled by a control module such as summary service control module 201 of FIG. 2 and the document and N-gram data is managed by a data management module such as data management module 211 of FIG. 2.

At 801, a two-dimensional N-gram item sequence representation is generated for a sentence. For example, a new sentence from an input document is utilized to generate a two-dimensional N-gram item sequence representation of the new sentence. The two-dimensional N-gram item sequence representation is composed of rows of N-grams, with one N-gram per row and where each N-gram is a sequence of N consecutive words from the sentence. The different N-gram rows are stacked to create a two-dimensional N-gram data structure and each row includes a different consecutive sequence of N words from the sentence. In various embodiments, the N-gram rows are generated by starting with the first word of the sentence for the first N-gram row, the second word of the sentence for the second N-gram row, the third word of the sentence for the third N-gram row, and so forth, until the last N-gram row. Since each N-gram contains exactly N words, the last N-gram row contains the last N words from the sentence. In various embodiments, the size N (or number of words) of the N-gram is configurable. For example, using five words as the size of the N-gram, each N-gram contains five words from the sentence. For a sentence with eight words, the first N-gram includes the first five words (words 1 through 5), the second N-gram includes words 2 through 6, the third N-gram includes words 3 through 7, and the fourth and last N-gram includes the last five words (words 4 through 8). The N-grams are arranged as rows to create a two-dimensional N-gram with four rows of N-grams. In some embodiments, when a sentence is parsed into words to create the two-dimensional N-gram, the parsed words can include adjacent punctuation such as commas, quotation marks, etc. In some embodiments, some or all punctuation may be stripped when parsing the sentence. In some embodiments, two-dimensional N-gram 1011 of FIG. 10 is an example of a generated two-dimensional N-gram for an example sentence.

At 803, each word of the two-dimensional N-gram is evaluated as meaningful or non-meaningful. For example, each word of each N-gram is evaluated using a meaningful test to determine whether the word is meaningful or non-meaningful. In some embodiments, an evaluation dictionary is used to determine whether a word is meaningful or non-meaningful. The determined meaningful or non-meaningful result for each word is stored alongside each word in the two-dimensional N-gram or in a similar and associated two-dimensional data structure. In some embodiments, labeled N-gram 1021 of FIG. 10 is an example of a two-dimensional data structure storing the evaluated words of a two-dimensional N-gram for an example sentence. In various embodiments, the evaluation dictionary is selected from multiple different evaluation dictionaries. For example, a specific evaluation dictionary can be selected and used based on the properties of the input document, such as file type, author(s), readers, viewers, subject matter, and storage location, among other properties. In some embodiments, a word is identified as a meaningful word by confirming that the word exists in the selected evaluation dictionary.

At 805, the sentence is evaluated and labeled using two-dimensional meaningful metrics. In various embodiments, one or more evaluation metrics are determined using the two-dimensional N-gram item sequence representation and evaluated results from 803. Using the evaluated metrics, the sentence is labeled as meaningful or non-meaningful. For example, in various embodiments, the evaluations performed at 803 for each word of the two-dimensional N-gram are used to evaluate the two-dimensional N-gram along a horizontal axis and a vertical axis. Based on the evaluated horizontal and vertical metrics, the sentence is labeled as meaningful or non-meaningful. In some embodiments, the evaluated metrics include one or more horizontal evaluation metrics and a single vertical evaluation metric. For example, in some embodiments, a horizontal metric is evaluated for each N-gram row. Depending on whether an N-gram's horizontal metric exceeds a horizontal threshold, the N-gram row is evaluated as meaningful or non-meaningful. Then using the meaningfulness evaluation for each N-gram row, a single vertical metric is evaluated. Depending on whether the vertical metric exceeds a vertical threshold, the sentence is evaluated and labeled as meaningful or non-meaningful.

At 807, a determination is made whether the sentence is labeled as meaningful. In the event the sentence is labeled as meaningful, processing proceeds to 809. In the event the sentence is labeled as non-meaningful, processing proceeds to 811.

At 809, the current sentence is included in the reduced document. For example, the current sentence is labeled as meaningful based on the evaluated metrics of the sentence. As a result of meeting a required meaningful threshold, the sentence is included in the reduced document.

At 811, the current sentence is excluded from the reduced document. For example, the current sentence failed to meet one or more evaluation metrics. By not meeting the required meaningful threshold, the current sentence is identified as non-meaningful and is excluded from the reduced document. By removing the sentence from the input document, the reduced document contains fewer words (as well as fewer tokens).

At 813, a determination is made whether additional sentences exist for processing. In the event additional sentences exist for analysis, processing loops back to 801 where a two-dimensional N-gram of the next sentence is generated. In the event no additional sentences exist for processing, the preprocessing of the document using two-dimensional N-grams completes. For example, the entire document has been analyzed for meaningful sentences and the identified non-meaningful sentences have been removed from the input document. The reduced document is then provided as an output of the process of FIG. 8.

Figure 9:
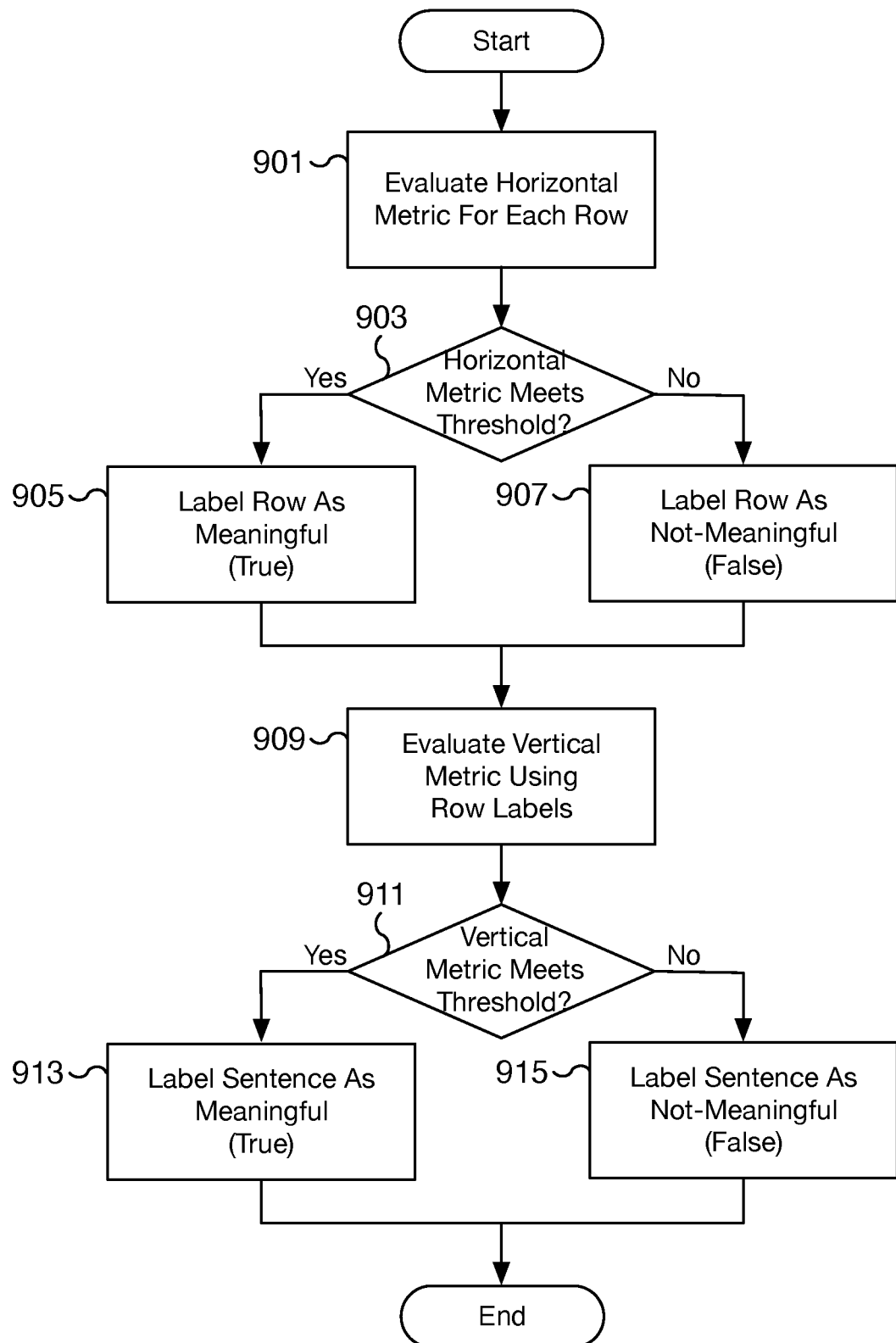
FIG. 9 is a flow chart illustrating an embodiment of a process for evaluating the meaningfulness of a sentence using a two-dimensional labeled N-gram.

FIG. 9 is a flow chart illustrating an embodiment of a process for evaluating the meaningfulness of a sentence using a two-dimensional labeled N-gram. In various embodiments, the two-dimensional labeled N-gram includes evaluated meaningfulness labels for each word of the two-dimensional N-gram. For example, each word of the two-dimensional N-gram is evaluated and labeled as meaningful or non-meaningful. In some embodiments, a meaningful word is labeled as True and a non-meaningful word is labeled as False. In some embodiments, the labels of the two-dimensional N-gram are evaluated at 803 of FIG. 8 and are stored alongside the N-gram or in an associated two-dimensional data structure. In some embodiments, the process of FIG. 9 is performed at 805 of FIG. 8 and determines whether to label the sentence used to generate the two-dimensional N-gram as meaningful or non-meaningful.

In some embodiments, the process of FIG. 9 is performed at 305 of FIG. 3, at 403 of FIG. 4A, and/or at 447 of FIG. 4C by a text reduction module. In some embodiments, the text reduction module is part of summarization service platform 125 of FIG. 1 and/or summarization service platform 200 of FIG. 2. In some embodiments, the process of FIG. 9 is performed by text reduction modules 221, 223, 225, and/or 229 of FIG. 2. In some embodiments, the control flow of the process of FIG. 9 including what input data is received by the text reduction module is controlled by a control module such as summary service control module 201 of FIG. 2 and the document and N-gram data is managed by a data management module such as data management module 211 of FIG. 2.

At 901, a horizontal metric is evaluated for each row. For example, a horizontal meaningfulness metric is evaluated for each N-gram row using the meaningfulness labels applied to the words of the N-gram row. In some embodiments, a horizontal metric is evaluated for each row based on the number of words within an N-gram row that are labeled meaningful (or True). For example, a horizontal metric can be evaluated for an N-gram row by counting the number of True labels in an N-gram's word sequence. In some embodiments, the evaluated horizontal metric corresponds to the density of meaningful words in the N-gram word sequence. In various embodiments, the evaluated horizontal metrics are meaningful metrics evaluated along a first (horizontal) dimension.

At 903, a determination is made whether the evaluated horizontal metric meets a threshold requirement. In various embodiments, the horizontal threshold requirement can be configured based on a configuration request, one or more properties of the input document, and/or other appropriate parameters or characteristics. In the event the evaluated horizontal metric meets the configured threshold requirement, processing proceeds to 905. For example, a horizontal threshold requirement can require that 60% of the words within an N-gram row are labeled as meaningful. In the event the evaluated horizontal metric does not meet the configured threshold requirement, processing proceeds to 907.

At 905, the current row is labeled as meaningful. In some embodiments, the label applied to a meaningful N-gram row is a True label. In various embodiments, an N-gram labeled as meaningful indicates that the sequence of words within the N-gram contains a high density of meaningful words.

At 907, the current row is labeled as non-meaningful. In some embodiments, the label applied to a non-meaningful N-gram row is a False label. In various embodiments, an N-gram labeled as non-meaningful indicates that the sequence of words within the N-gram does not contain a high density of meaningful words.

At 909, a vertical metric is evaluated using the row labels. For example, using the labels applied to the N-gram rows at 905 and 907, a vertical meaningful metric is evaluated. In some embodiments, a vertical metric is evaluated based on the number of N-gram rows that are labeled meaningful (or True). For example, a vertical metric can be evaluated by counting the number of N-gram rows with a True label. In some embodiments, the evaluated vertical metric corresponds to the density of meaningful and overlapping word sequences of length N within the sentence. In various embodiments, the evaluated vertical metric is a meaningful metric evaluated along a second (vertical) dimension and the evaluated metric applies to the meaningfulness of the sentence.

At 911, a determination is made whether the evaluated vertical metric meets a threshold requirement. In various embodiments, the vertical threshold requirement can be configured based on a configuration request, one or more properties of the input document, and/or other appropriate parameters or characteristics. In the event the evaluated vertical metric meets the configured threshold requirement, processing proceeds to 913. For example, a vertical threshold requirement can require that 80% of the N-gram rows are labeled as meaningful. In the event the evaluated vertical metric does not meet the configured threshold requirement, processing proceeds to 915.

At 913, the current sentence is labeled as meaningful. In some embodiments, the label applied to meaningful sentences is a True label. In various embodiments, a sentence labeled as meaningful will be included in a reduced document.

At 915, the current sentence is labeled as non-meaningful. In some embodiments, the label applied to non-meaningful sentences is labeled as False. In various embodiments, a sentence labeled as non-meaningful will not be included in a reduced document.

FIG. 10 is a diagram illustrating an example sentence and its corresponding two-dimensional N-gram and evaluated results when applying a two-dimensional N-gram preprocessing technique. In the example shown, FIG. 10 includes an example input sentence 1001, two-dimensional N-gram 1011, two-dimensional labeled N-gram 1021, evaluated N-gram row labels 1031, and evaluated sentence label 1041. In various embodiments, input sentence 1001 is evaluated using a two-dimensional N-gram preprocessing technique described with respect to FIGS. 8 and 9. For example, when analyzing input sentence 1001, two-dimensional N-gram 1011 is generated at 801 of FIG. 8 and evaluated at 803 of FIG. 8 to create two-dimensional labeled N-gram 1021. Similarly, two-dimensional labeled N-gram 1021 is used to evaluate and label input sentence 1001 at 805 of FIG. 8 and/or by the process of FIG. 9. In various embodiments, two-dimensional labeled N-gram 1021 is used to evaluate horizontal metrics that result in evaluated N-gram row labels 1031 at 901 of FIG. 9 and evaluated N-gram row labels 1031 is used to evaluate a vertical metric at 909 of FIG. 9 that is used to label input sentence 1001 with evaluated sentence label 1041.

In the example of FIG. 10, input sentence 1001 is the sentence "Can you check this one, PRB has been declared fixed for MP8?" Two-dimensional N-gram 1011 uses an N configuration of 5, resulting in eight N-gram rows, where each N-gram contains a five consecutive word sequence of input sentence 1001. The first N-gram row of two-dimensional N-gram 1011 uses the first five consecutive word sequence of input sentence 1001, the second N-gram row of two-dimensional N-gram 1011 uses the next overlapping five consecutive word sequence of input sentence 1001 starting with the second word of input sentence 1001, the third N-gram row of two-dimensional N-gram 1011 uses the next overlapping five consecutive word sequence of input sentence 1001 starting with the third word of input sentence 1001, and so forth. The last N-gram row of two-dimensional N-gram 1011 uses the last five consecutive word sequence of input sentence 1001.

In various embodiments, two-dimensional N-gram 1011 is used at 803 of FIG. 8 to create two-dimensional labeled N-gram 1021 by evaluating each word of two-dimensional N-gram 1011 as meaningful or non-meaningful. In the example shown, words evaluated as meaningful are labeled True and words evaluated as non-meaningful are labeled False (where the False label is shown bold and underlined). The determined meaningful or non-meaningful result for each word can be stored alongside each word in two-dimensional N-gram 1011 (not shown) or in a similar and associated two-dimensional data structure as shown with two-dimensional labeled N-gram 1021. For input sentence 1001, the words "PRB" and "MP8" are analyzed and labeled as non-meaningful whereas all other words of the sentence are labeled as meaningful to create two-dimensional labeled N-gram 1021.

In various embodiments, each N-gram row is evaluated to determine a horizontal metric based on the labeled words of the N-gram row. In some embodiments, the horizontal metric is evaluated by counting the number of True labels associated with each N-gram row. The horizontal metric of each N-gram row is compared against a configured horizontal threshold. In the event the horizontal metric meets the horizontal threshold, the N-gram row is labeled as meaningful or True. In the event the horizontal metric does not meet the horizontal threshold, the N-gram row is labeled as non-meaningful or False. In the example shown, evaluated N-gram row labels 1031 displays the determined label for each associated N-gram row. Using an example horizontal threshold of 60%, each N-gram row meets the horizontal threshold and is labeled as meaningful with a True label. For example, N-gram rows 2-6 and 8 each have a horizontal metric of 5 or 80% and exceed the horizontal threshold of 60% with 80% of the labeled words evaluated as meaningful. In various embodiments, evaluated N-gram row labels 1031 includes the label results determined by evaluating along a first (horizontal) dimension.

In various embodiments, the results of the horizontal evaluation shown with N-gram row labels 1031 are used to evaluate a vertical metric that is based on the meaningfulness of each N-gram row. In some embodiments, the vertical metric is evaluated by counting the number of True labels among the N-gram rows or within N-gram row labels 1031. The vertical metric is compared against a configured vertical threshold. In the event the vertical metric meets the vertical threshold, input sentence 1001 is labeled as meaningful or True. In the event the vertical metric does not meet the vertical threshold, input sentence 1001 is labeled as non-meaningful or False. In the example shown, evaluated sentence label 1041 displays the determined label for input sentence 1001. Using an example vertical threshold of 80%, input sentence 1001 meets the vertical threshold and is labeled as meaningful with a True label. In various embodiments, evaluated sentence label 1041 includes the sentence label result determined by evaluating along a second (vertical) dimension. In various embodiments, the determined meaningfulness of input sentence 1001 can be used during preprocessing to determine whether to include or exclude input sentence 1001 from a reduced version of an original document.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving origin text content to be analyzed using natural language processing;
   generating a two-dimensional item sequence representation for at least a portion of the received origin text content, wherein the portion of the received origin text content used to generate the two-dimensional item sequence representation corresponds to a sentence included in the received origin text content, wherein the two-dimensional item sequence representation is arranged into rows, wherein each row includes a different consecutive sequence of a same number of words from the sentence, wherein a first row of the two-dimensional item sequence representation includes beginning consecutive words of the sentence and a last row of the two-dimensional item sequence representation includes last consecutive words of the sentence;

using one or more processors to determine one or more evaluation metrics based on an analysis of the two-dimensional item sequence representation, wherein the one or more evaluation metrics includes one or more horizontal evaluation metrics and a vertical evaluation metric, the one or more horizontal evaluation metrics are determined using an evaluation dictionary, and the vertical evaluation metric is based at least in part on the one or more horizontal evaluation metrics;

based on the one or more evaluation metrics, automatically generating a reduced version of the origin text content to assist in satisfying a constraint of a natural language processing model; and using the reduced version of the origin text content as an input to the natural language processing model.

2. The method of claim 1, further comprising including the portion of the received origin text content used to generate the two-dimensional item sequence representation in the reduced version of the origin text content based on the one or more evaluation metrics.

3. The method of claim 1, wherein the one or more horizontal evaluation metrics includes a horizontal evaluation metric for each row of rows included in the two-dimensional item sequence representation.

4. The method of claim 3, wherein the horizontal evaluation metric for the each row is determined based on whether each word of the row exists in the evaluation dictionary.

5. The method of claim 4, wherein the evaluation dictionary is selected from a plurality of evaluation dictionaries based on a property of the origin text content.

6. The method of claim 1, wherein the vertical evaluation metric is evaluated using the one or more horizontal evaluation metrics.

7. The method of claim 1, wherein each horizontal metric of the one or more horizontal evaluation metrics is compared to a horizontal threshold.

8. The method of claim 7, wherein the horizontal threshold is configured based on a property of the origin text content.

9. The method of claim 1, further comprising providing a result of the natural language processing model for use in managing a computerized workflow.

10. The method of claim 1, wherein the constraint of the natural language processing model includes a word count constraint on the input to the natural language processing model.

11. A system, comprising:
one or more processors; and
a memory coupled to the one or more processors, wherein the memory is configured to provide the one or more processors with instructions which when executed cause the one or more processors to:
receive an origin text content to be analyzed using natural language processing;
generate a two-dimensional item sequence representation for at least a portion of the received origin text content, wherein the portion of the received origin text content used to generate the two-dimensional item sequence representation corresponds to a sentence included in the received origin text content, wherein the two-dimensional item sequence representation is arranged into rows, wherein each row includes a different consecutive sequence of a same number of words from the sentence, wherein a first row of the two-dimensional item sequence representation includes beginning consecutive words of the sentence and a last row of the two-dimensional item sequence representation includes last consecutive words of the sentence;

determine one or more evaluation metrics based on an analysis of the two-dimensional item sequence representation, wherein the one or more evaluation metrics includes one or more horizontal evaluation metrics and a vertical evaluation metric, the one or more horizontal evaluation metrics are determined using an evaluation dictionary, and the vertical evaluation metric is based at least in part on the one or more horizontal evaluation metrics;

based on the one or more evaluation metrics, automatically generate a reduced version of the origin text content to assist in satisfying a constraint of a natural language processing model; and use the reduced version of the origin text content as an input to the natural language processing model.

12. The system of claim 11, wherein the one or more horizontal evaluation metrics includes a horizontal evaluation metric for each row of rows included in the two-dimensional item sequence representation, and wherein the horizontal evaluation metric for the each row is determined based on whether each word of the row exists in the evaluation dictionary.

13. The system of claim 12, the vertical evaluation metric is evaluated using the one or more horizontal evaluation metrics.

14. A computer program product, the computer program product being embodied in a non-transitory computer readable storage medium and comprising computer instructions for:
receiving origin text content to be analyzed using natural language processing;
generating a two-dimensional item sequence representation for at least a portion of the received origin text content, wherein the portion of the received origin text content used to generate the two-dimensional item sequence representation corresponds to a sentence included in the received origin text content, wherein the two-dimensional item sequence representation is arranged into rows, wherein each row includes a different consecutive sequence of a same number of words from the sentence, wherein a first row of the two-dimensional item sequence representation includes beginning consecutive words of the sentence and a last row of the two-dimensional item sequence representation includes last consecutive words of the sentence;

determining one or more evaluation metrics based on an analysis of the two-dimensional item sequence representation, wherein the one or more evaluation metrics includes one or more horizontal evaluation metrics and a vertical evaluation metric, the one or more horizontal evaluation metrics are determined using an evaluation dictionary, and the vertical evaluation metric is based at least in part on the one or more horizontal evaluation metrics;

based on the one or more evaluation metrics, automatically generating a reduced version of the origin text content to assist in satisfying a constraint of a natural language processing model; and using the reduced version of the origin text content as an input to the natural language processing model.

15. The system of claim 11, wherein the evaluation dictionary is selected from a plurality of evaluation dictionaries based on a property of the origin text content.

16. The system of claim 11, wherein each horizontal metric of the one or more horizontal evaluation metrics is compared to a horizontal threshold.

17. The computer program product of claim 14, wherein the one or more horizontal evaluation metrics includes a horizontal evaluation metric for each row of rows included in the two-dimensional item sequence representation, and wherein the horizontal evaluation metric for the each row is determined based on whether each word of the row exists in the evaluation dictionary.

18. The computer program product of claim 14, wherein the vertical evaluation metric is evaluated using the one or more horizontal evaluation metrics.

19. The computer program product of claim 14, wherein the evaluation dictionary is selected from a plurality of evaluation dictionaries based on a property of the origin text content.

20. The computer program product of claim 14, wherein each horizontal metric of the one or more horizontal evaluation metrics is compared to a horizontal threshold.

* * * * *